(12) United States Patent
Asao et al.

(10) Patent No.: US 9,393,906 B2
(45) Date of Patent: *Jul. 19, 2016

(54) GENERATION DEVICE FOR VEHICLE-EVOCATIVE SOUND AND GENERATION METHOD FOR VEHICLE-EVOCATIVE SOUND

(75) Inventors: Koji Asao, Tomioka (JP); Junichi Tanaka, Kumagaya (JP)

(73) Assignee: PIONEER CORPORATION, Kanagawa (JP)

( * ) Notice: Subject to any disclaimer, the term of this patent is extended or adjusted under 35 U.S.C. 154(b) by 587 days.

This patent is subject to a terminal disclaimer.

(21) Appl. No.: 13/637,279

(22) PCT Filed: Oct. 8, 2010

(86) PCT No.: PCT/JP2010/067790
§ 371 (c)(1),
(2), (4) Date: Oct. 1, 2012

(87) PCT Pub. No.: WO2011/118064
PCT Pub. Date: Sep. 29, 2011

(65) Prior Publication Data
US 2013/0016218 A1 Jan. 17, 2013

(30) Foreign Application Priority Data

Mar. 25, 2010 (WO) ................. PCT/JP2010/055169

(51) Int. Cl.
*G06F 7/00* (2006.01)
*B60Q 5/00* (2006.01)
(Continued)

(52) U.S. Cl.
CPC . *B60Q 5/008* (2013.01); *B60L 3/00* (2013.01); *B60Q 5/00* (2013.01); *B60Q 9/00* (2013.01)

(58) Field of Classification Search
CPC ............ B60Q 5/00; B60Q 5/008; B60Q 9/00; B60L 3/00; H04R 9/16; H04R 19/10; H04R 17/08; H04R 11/12; H04R 5/00; H04R 29/00; H04S 5/00; H04S 5/005; G10K 15/08; H04B 1/082; H03G 3/32

USPC .......... 381/58, 61, 86, 98, 119, 17; 701/45, 1, 701/22, 36
See application file for complete search history.

(56) References Cited

U.S. PATENT DOCUMENTS 7,289,018 B2 * 10/2007 Ewerhart et al. .............. 340/435
2005/0232432 A1 * 10/2005 Yasushi ................... B60Q 9/00
381/17

(Continued)

FOREIGN PATENT DOCUMENTS

| JP | 7-209424 | 8/1995 |
|---|---|---|
| JP | 2001-023097 | 1/2001 |

(Continued)

OTHER PUBLICATIONS

International Search Report, PCT/JP2010/067790, Jan. 11, 2011.

*Primary Examiner* — Vivian Chin
*Assistant Examiner* — Ubachukwu Odunukwe
(74) *Attorney, Agent, or Firm* — Young & Thompson

(57) ABSTRACT

Disclosed is a vehicle-like sound generation method wherein an acquisition unit (730A) refers to map information contained in a memory unit (710) based on the current position of a vehicle (MV) detected by a position detection unit (720), acquires lane information including the number of lanes on the road the vehicle (MV) is currently driving on, and sends the acquired lane information to a determination unit (740). Then, the determination unit (740) determines the range of the vehicle-like sound output towards the exterior of the vehicle based on the lane information sent by the acquisition unit (730A). Next, a control unit (750) calculates the volume setting for the vehicle-like sound output from the left and right speakers of a sound output unit (760) based on the determined range. Thus, output of the vehicle-like sound can be controlled while taking into account the probability that persons to be notified are present in surroundings which change due to the type of road currently being driven on.

14 Claims, 15 Drawing Sheets

(51) Int. Cl.
*B60L 3/00* (2006.01)
*B60Q 9/00* (2006.01)

(56) References Cited

U.S. PATENT DOCUMENTS

| | | | | |
|---|---|---|---|---|
| 2007/0168113 A1* | 7/2007 | Litkouhi | ................ | G01C 21/26 701/532 |
| 2010/0079590 A1* | 4/2010 | Kuehnle et al. | ............... | 348/118 |
| 2010/0316734 A1* | 12/2010 | Hart et al. | ...................... | 424/646 |
| 2011/0313617 A1* | 12/2011 | Omote | .................. | B60Q 5/008 701/36 |
| 2012/0166042 A1* | 6/2012 | Kokido | .................. | B60Q 5/008 701/36 |
| 2012/0316734 A1* | 12/2012 | Takagi | .................. | B60Q 5/008 701/45 |
| 2013/0016851 A1* | 1/2013 | Asao | ...................... | B60Q 5/008 381/86 |

FOREIGN PATENT DOCUMENTS

| | | | | |
|---|---|---|---|---|
| JP | 2001023097 | * | 1/2001 | ............... B06Q 5/00 |
| JP | 2005-253236 | | 9/2005 | |
| JP | 2006-021667 | | 1/2006 | |
| JP | 2006021667 | * | 1/2006 | ............... B60Q 5/00 |

* cited by examiner

Single Vehicle Lane Processing (Step S14)

First Multiple Vehicle Lane Processing (Step S16)

GENERATION DEVICE FOR VEHICLE-EVOCATIVE SOUND AND GENERATION METHOD FOR VEHICLE-EVOCATIVE SOUND

TECHNICAL FIELD

The present invention relates to a vehicle-evocative sound generation device, a method for generating vehicle-evocative sound, generation program for vehicle-evocative sound, and to a recording medium to be stored thereof.

BACKGROUND ART

In recent years, electric automobiles employing batteries as a drive power source and hybrid cars employ the batteries as partial drive power source have become popular. When such an automobile uses the battery as the drive power source to drive, the drive noise level outside of the vehicle becomes dramatically lower as compared to those from a conventional gasoline vehicle. As a result, it may happen that a pedestrian or a cyclist does not notice a vehicle approaching to them from outside his field of view. The occurrence of the situation is a serious traffic safety problem.

Due to this, a technique has been proposed for outputting a running noise corresponding to the running condition of the vehicle outside the vehicle (see Patent Document #1, hereinafter, it is referred to as "prior art #1"). In the technique of the prior art #1, the running noise is output outside the vehicle ahead or the like through a speaker for generating a traveling signal based on the detection results of the vehicle speed, the rotational speed of the motor as the power source, the accelerator position, and so on. Then, it is controlled whether the traveling sound is output or not, depending on a region type through which the vehicle is traveling.

Moreover, a technique has been proposed (see Patent Document #2, hereinafter called the "prior art #2") for automatically warning a pedestrian existing ahead in a traveling direction of the vehicle, although it is not the technique for outputting a vehicle-evocative sound such as a running noise that corresponds to the running condition of the vehicle or the like. In the technique of the prior art #2, a subject presents ahead in the traveling direction of the vehicle are detected. If the subject is detected, the subject is warned by using a warning sound outputted from the speaker.

PRIOR ART DOCUMENTS

Patent Literature

Patent Document #1: Japanese Laid-Open Patent Publication 2005-253236.
Patent Document #2: Japanese Laid-Open Patent Publication Heisei 7-209424.

SUMMARY OF THE INVENTION

Problems to be Solved by the Invention

The technique of the prior art #1 controls the execution/non-execution of pseudonoise output, depending on the region type through which the vehicle is traveling. However, it does not control the pseudonoise output in consideration of the road condition upon which the vehicle is traveling. As a result, if the region type is the same, it cannot control the running noise output with consideration for the probable presence of the pedestrian or the cyclist or the like around the vehicle.

Moreover, the technique of the prior art #2 outputs the warning sound only in cases which the subject exists ahead in the traveling direction is detected. As a result, for example, the vehicle approach cannot be warned, when the pedestrian, the cyclist or the like cannot be detected because they are hidden by a building or the like.

Due to this, the technique is eagerly awaited for properly alerting the pedestrian, the cyclist or the like to the approach of the vehicle, even if they cannot be detected by the vehicle. It is raised as one of the problems to be solved by the present invention for responding a request.

The present invention has been completed under the above-mentioned circumstances. Its object is to provide a vehicle-evocative sound generation device and a method for generating vehicle-evocative sound, wherein the sound is properly controlled, considering to the probability of the subject to be warned, which changes depending on the lane class upon which the vehicle is traveling.

Means for Solving the Problems

When viewed from the first standpoint, the present invention is a vehicle-evocative sound generation device that outputs vehicle-evocative sound from a sound output part to the outside a vehicle comprising: an acquisition part configured to acquire vehicle lane information including vehicle lane number information that specifies the vehicle lane numbers on the road upon which said vehicle is traveling; a determination part configured to determine a vehicle-evocative sound arrival range over which vehicle-evocative sound outputted from said sound output part is to arrive, on the basis of said acquired vehicle lane information; and a control part configured to control the output of vehicle-evocative sound from said sound output part to correspond to said determined vehicle-evocative sound arrival range.

When viewed from the second standpoint, the present invention is a generation method for vehicle-evocative sound employed by a generation device for vehicle-evocative sound that outputs vehicle-evocative sound from a sound output part outside a vehicle, comprising the steps of: acquiring vehicle lane information including vehicle lane number information that specifies the vehicle lane number on the road upon which said vehicle is traveling; determining a vehicle-evocative sound arrival range over which vehicle-evocative sound outputted from said sound output part should arrive, on the basis of said acquired vehicle lane information; and controlling the output of vehicle-evocative sound from said sound output part to correspond to said determined vehicle-evocative sound arrival range.

Moreover, when viewed from the third standpoint, the present invention is a generation program for vehicle-evocative sound, wherein it causes a calculation part to execute a generation method for vehicle-evocative sound according to the present invention.

Furthermore, when viewed from the fourth standpoint, the present invention is a recording medium, wherein a generation program for vehicle-evocative sound according to the present invention is recorded thereon so as to be readable by a calculation part.

DESCRIPTION OF THE PREFERRED EMBODIMENTS

Embodiments of the present invention are explained with reference to the appended drawings. Note that the same or equivalent elements are given the same reference symbols to omit the duplication in the explanation and drawings in below.

The First Embodiment

First, the first embodiment of the present invention is explained with reference to FIG. 1.
<Configuration>

Figure 1:
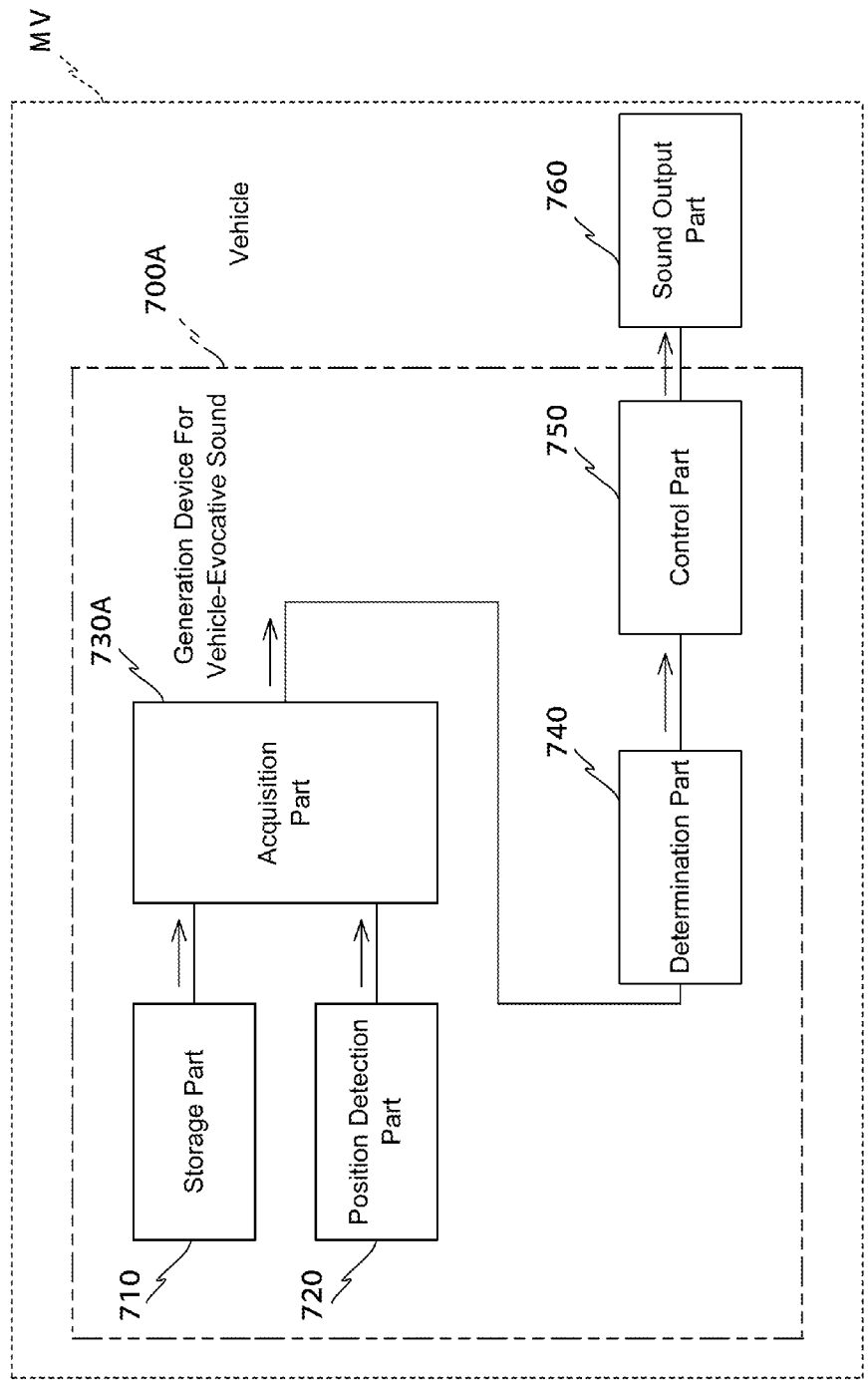
FIG. 1 is a block diagram for explaining the configuration of a generation device for vehicle-evocative sound of the first embodiment of the present invention.

FIG. 1 shows the schematic configuration of a vehicle-evocative sound generation device 700A of the first embodiment. As shown in FIG. 1, the vehicle-evocative sound generation device 700A is mounted to a vehicle MV, and connected to a sound output part 760.

Here, the 760 comprises a vehicle-evocative sound signal generation part, an audio volume adjustment part, and speakers. In the first embodiment, the part 760 comprises two speakers: a left speaker that outputs noise forward of the vehicle MV to the left, and a right speaker that outputs noise forward of the vehicle MV to the right. Note that a control part 750 described hereinafter is adapted to establish audio volume settings mutually independent for each of the left and right speakers.

The part 760 receives the audio volume settings from the part 750. The part 760 then adjusts the audio volumes of the vehicle-evocative sound signals generated by the vehicle-evocative sound signal generation part depending on the audio volumes set by the audio volume adjustment part to output vehicle-evocative sounds outside the vehicle MV from the speakers.

The device 700A comprises a storage part 710, a position detection part 720, and an acquisition part 730A. Moreover, the vehicle-evocative sound generation device 700A comprises a determination part 740 and the part 750.

A variety of information utilized by the device 700A is stored in the part 710. The information comprises map information, including vehicle lane information containing the vehicle lane number information. Here, in the first embodiment, opposite lane presence information are present is also included in the vehicle lane information.

Note that the term "number of vehicle lanes" is used with the meaning of the total vehicle lane number, counted to include the number of opposite vehicle lanes in the specification.

The part 720 detects the current position of the vehicle MV to be sent to the part 730A.

The part 730A receives the current position sent from the part 720. The part 730A refers to the map information in the storage part 710 by using the current position as a key to acquire the vehicle lane information for the road upon which the vehicle is traveling. Due to this, the vehicle lane information to be acquired is sent to the part 740.

The part 740 receives the vehicle lane information sent from the part 730A. The part 740 then determines ranges over which vehicle-evocative sound such as engine pseudonoise or warning noise or the like outputted outside the vehicle by the part 760 should arrive (hereinafter, it is simply referred to as the "arrival ranges"). Thus determined arrival ranges for the vehicle-evocative sound are sent to the part 750. Note that the determination processing by performed the part 740 is described hereinafter.

The 750 receives the arrival ranges information from the part 740 to sends audio volume settings that are necessary for ensuring the arrival ranges to the part 760.
<Operation>

Next, the operation of the vehicle-evocative sound generation device 700A having the configuration is explained. Note that it is supposed that the part 720 detects the current position of the vehicle MV to periodically send the current position to the part 730A.

Upon receipt of the current position of the vehicle MV, the part 730A refers to the map information in the part 710 on the basis of that current position; then acquires the number of vehicle lanes upon which the vehicle MV is currently traveling and whether or not an opposite vehicle lane or lanes are present. The part 730A then sends the number of vehicle lanes and whether or not an opposite vehicle lane or lanes as vehicle lane information to the determination part 740.

Upon receipt of the vehicle lane information sent from the part 730A, the part 740 makes the first decision whether or not the number of vehicle lanes is "1", on the basis of the number of vehicle lanes information in the vehicle lane information. If the first decision result is affirmative, the part 740 determines predetermined ranges that are symmetrical to the left and the right with respect to the traveling direction of the vehicle MV as the arrival ranges.

Note that the "predetermined ranges" are preliminary determined on the basis of experiments, simulation, experience and so on, from the standpoint for alerting the attention of the vehicle approaching to a pedestrian or a bicyclist on either side of the road, considering the average road width, of which lane number is "1".

On the other hand, if the first decision result is negative, namely, if there are several vehicle lanes, the part 740 then further makes the second decision whether or not an opposite vehicle lane is present, on the basis of the information in the vehicle lane information about the opposite lane presence. If the second decision result is negative, the 740 determines a broader range for the side on which the pedestrian or the like may be present than the predetermined range as the vehicle-evocative sound arrival range; because there is a possibility that the pedestrian or the like may be closely present against the traveling direction of the vehicle MV. For example, the side means the left side in a country, whether vehicles drive on the left side by law, and the right side in a country, when the vehicles drive on the right side by law. Hereinafter, it is referred to as "pedestrian side"). Since the running speed of the vehicle MV is higher in a road having multiple vehicle lanes than that having a single vehicle lane, the necessity to attract attention for the approach of the vehicle MV becomes higher.

On the other hand, if the second decision result is affirmative, the part 740 determines a range as the arrival range, which is broader in the pedestrian side than that of the pre-determined range, and narrower in the opposite lane side to the traveling direction of the vehicle MV than the predetermined range. Namely, in the opposite lane side, it is assumed that no pedestrian or the like are present, because there is low possible presence of them. For example, the part 740 determines the range so as to become minimum in the opposite lane side as the arrival range.

After the arrival range is thus determined, the part 740 sends the arrival ranges to the part 750. Upon receipt of these arrival ranges, the part 750 calculates the audio volumes to be set.

Here, if the arrival range is the predetermined one, the part 750 calculates a predetermined set audio volume as that for both of the left and right speakers. Note that the "predetermined set audio volume" is determined in advance on the basis of experiments, simulation, and experience and so on, from the standpoint for setting the predetermined range to the arrival range.

Furthermore, when the pedestrian side range is enlarged than the predetermined range, the part 750 calculates a higher set audio volume than that as the set audio volume for the speaker on the pedestrian side.

Moreover, when the arrival range of the opposite lane side is narrowed than the predetermined range, it calculates a lower set audio volume than that as the set audio volume for the speaker on the opposite lane side. For example, if the minimum arrival range is sent on the opposite lane side, the part 750 establishes a set audio volume such that no vehicle-evocative sound is outputted from the speaker on the opposite lane side.

When the audio volume settings are calculated, the part 750 sends the calculated audio volume settings to the part 760. Upon receipt of the audio volume settings, the part 760 outputs vehicle-evocative sound outside the vehicle MV from the speakers, adjusting the audio volumes thereof according to the audio volume settings.

As explained above, in the first embodiment, the acquisition part 730A acquires vehicle lane information, including the number of vehicle lanes information on which the vehicle MV is traveling, referring to the map information in the part 710 on the basis of the current position of the vehicle MV detected by the part 720. Subsequently, the acquisition part 730A sends the acquired vehicle lane information to the part 740. The part 740 determines the arrival ranges for the vehicle-evocative sound to be outputted outside the vehicle on the basis of the vehicle lane information from the part 730A. Subsequently, the part 750 calculates the audio volume settings for the vehicle-evocative sounds to be outputted from the left and right speakers of the part 760, on the basis of the determined arrival ranges by the part 750. As a result, the vehicle-evocative sounds having audio volumes corresponding to the audio volume settings are outputted outside the vehicle from both of the left and right speakers of the part 760.

Therefore, according to the first embodiment, the output of the vehicle-evocative sound during traveling is controlled, considering the possibility for the existence of the subject such as human in the circumstances that change depending on the classes of the road, namely, vehicle lane numbers.

Moreover, in the first embodiment, if the vehicle lane number is "1", the part 740 determines the arrival ranges as the predetermined range, which has symmetrical range to the traveling direction of the vehicle MV. If the number is plural, it determines the arrival range, which has the broader range in the side wherein it is highly possible that the pedestrian or the like is closely present against the traveling direction of the vehicle MV as the predetermined range. Furthermore, if there is the opposite lane, the determination part 740 determines the arrival range, which has the narrower range in the opposite lane side wherein it is less possible that the pedestrian or the like is present against the traveling direction of the vehicle MV, as the predetermined range.

Due to this, according to the first embodiment, the vehicle-evocative sound may be output at a reasonable output audio volume, considering the presence of the subject to be alerted.

<Modification of the First Embodiment>

The first embodiment may be altered in various ways.

Figure 2:
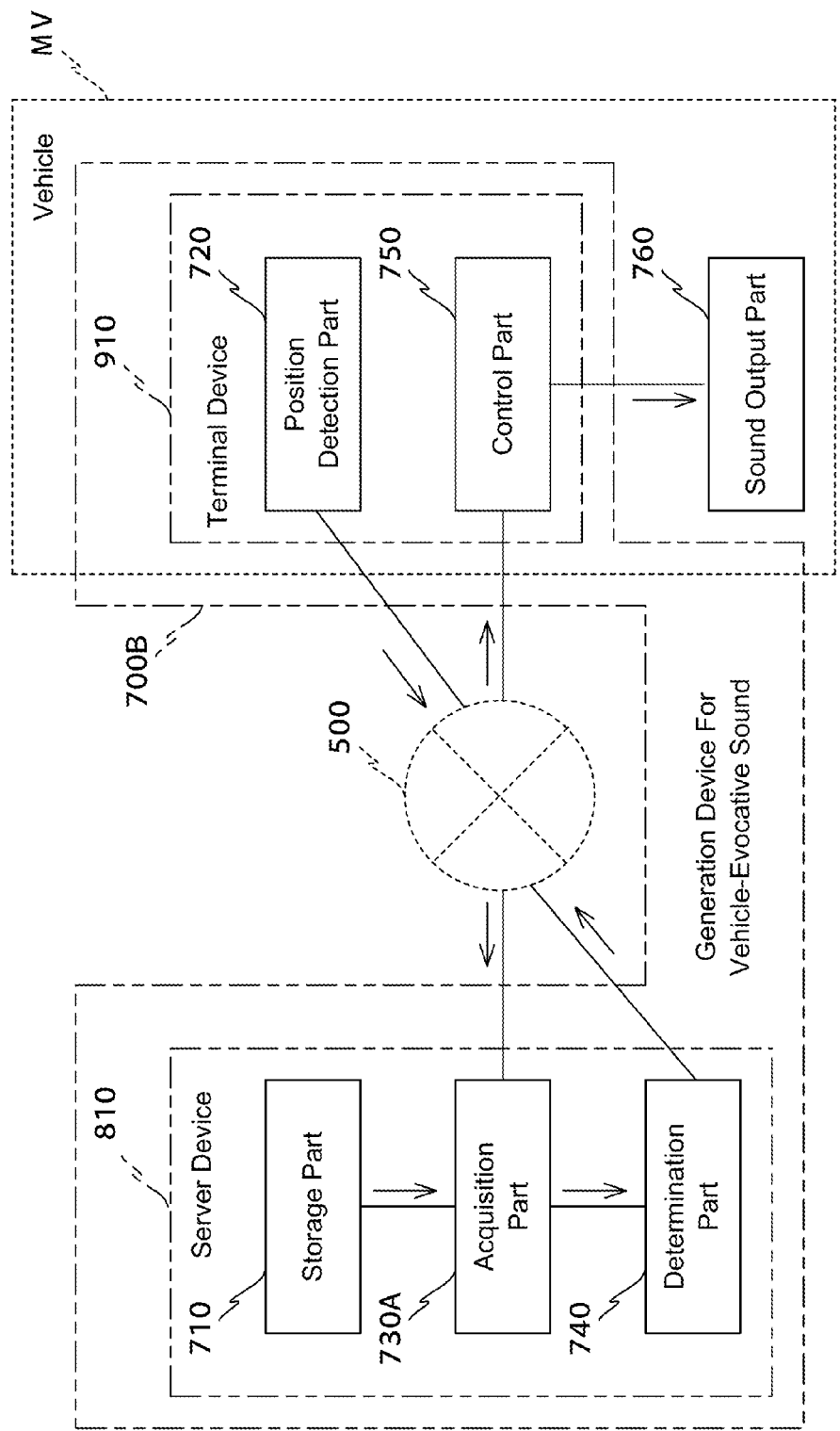
FIG. 2 is the figure for explaining a variant of the first embodiment (No. 1)

In the first embodiment, all of the elements for the vehicle-evocative sound generation device 700A, the storage part 710, the position detection part 720, the acquisition part 730A, the determination part 740, and the control part 750, are arranged to be mounted upon the vehicle MV. In contrast, it may employ the configuration, for example, being composed of a server device 810 and a terminal device 910 in the vehicle-evocative sound generation device 700B as shown in FIG. 2. In the vehicle-evocative sound generation device 700B, the server device 810 comprises the storage part 710, the acquisition part 730A, and the part 740, and the device 910 comprises the part 720 and the part 750. In the device 700B, there is the difference from the device 700A that data communication utilizing a communication network 500 is performed, when the current position of the vehicle MV detected by the part 720 is sent from the part 720 to the part 730A and the arrival ranges of the vehicle-evocative sound determined by the part 740 are sent from the part 740 to the part 750.

Figure 3:
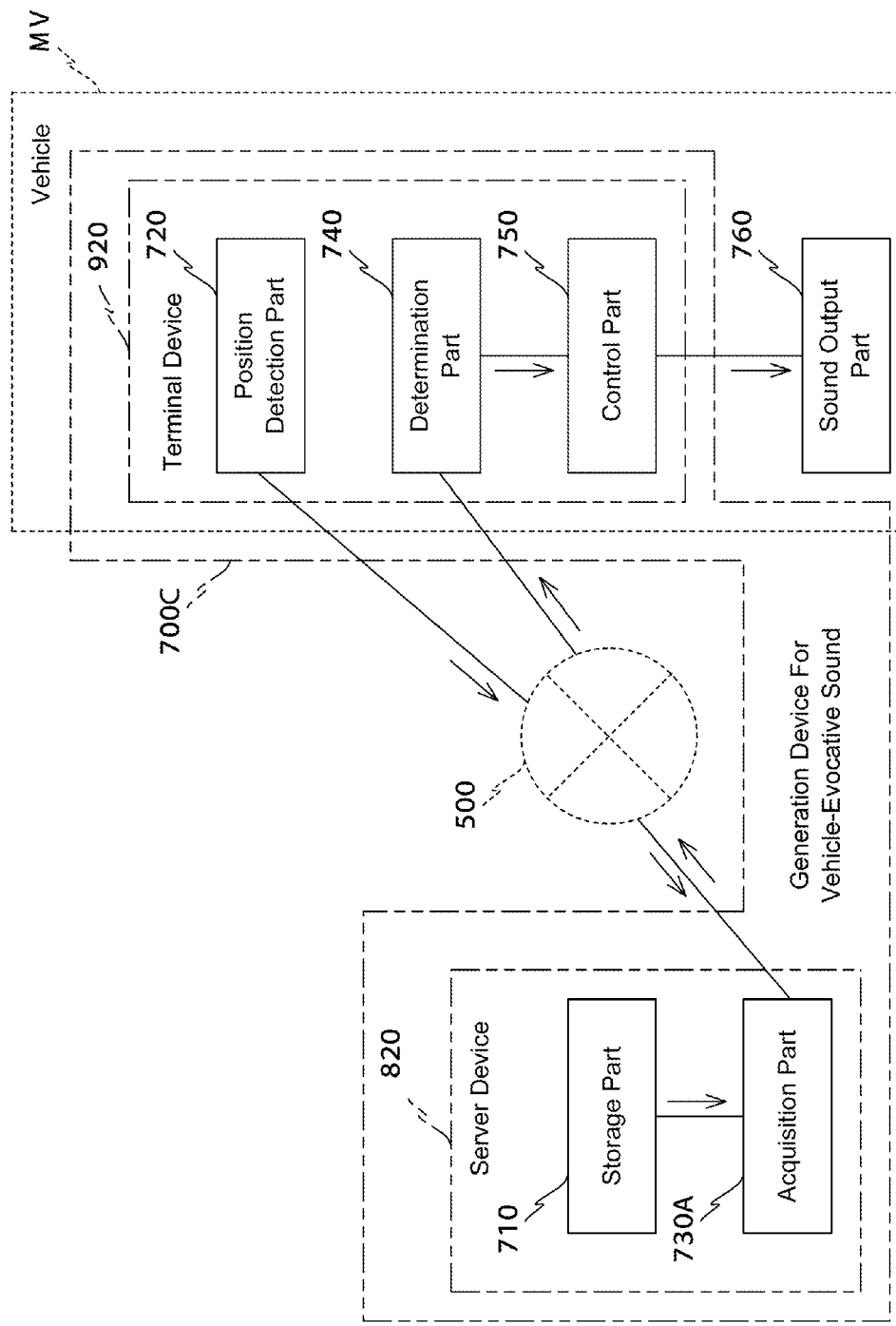
FIG. 3 is the figure for explaining the modification of the first embodiment (No. 2)

Furthermore, the vehicle-evocative sound generation device 700C may also have a configuration comprising the server device 820 and a terminal device 920, as in the shown in FIG. 3. In the vehicle-evocative sound generation device 700C, the server device 820 includes the storage part 710 and the acquisition part 730A, and the terminal device 920 includes the position detection part 720, the determination part 740, and the control part 750. In the vehicle-evocative sound generation device 700C, there is the difference from the vehicle-evocative sound generation device 700C that data communication utilizing a communication network 500 is performed, when the current position of the vehicle MV detected by the position detection part 720 is sent from the position detection part 720 to the acquisition part 730A, and the vehicle lane information acquired by the acquisition part 730A is sent from the acquisition part 730A to the determination part 740, these operations are performed by data communication employing a communication network 500.

Note that it is essential for the terminal device to comprise the control part 750, if it employs the configuration comprising the server device and the terminal device such as the vehicle-evocative sound generation device 700B or 700C. However, either the server device or the terminal device may comprise each of the storage part 710, the acquisition part 730A, and the determination part 740.

Moreover, in the vehicle-evocative sound generation devices 700A-700C, the position detection part 720 is separately provided. However, instead of it, the position detection result from the device having the position detection function already present in the vehicle (for example, a cell phone endowed with a GPS function) may be utilized.

Furthermore, in the vehicle-evocative sound generation devices 700A-700C, the storage part configured stores the map information is separately provided. However, instead of it, the map information in other device is accessed to be utilized, if the other device (for example, the navigation device) has the function for storing it.

Furthermore, in vehicle-evocative sound the generation devices 700A-700C, the sound output part 760 to be mounted on the vehicle is not provided. However, the sound output part 760 may be provided.

In the modified embodiments, the vehicle lane information is acquired by the acquisition part 730A, which is used by the determination part 740 to determine the arrival ranges for the vehicle-evocative sounds to be outputted outside the vehicle, when the server device and the terminal device may be provided such as the vehicle-evocative sound generation device 700B or the vehicle-evocative sound generation device 700C. In contrast, the road width information upon which the vehicle is traveling may be acquired by the acquisition part 730A, which is used to determine the arrival ranges for the vehicle-evocative sounds to be outputted outside the vehicle. In such a modified case, for example, the arrival ranges for the vehicle-evocative sound may be determined as follows.

Firstly, the acquisition part 730A acquires road width information for the road upon which the vehicle MV is traveling on the basis of the current position of the vehicle MV detected by the position detection part 720, referring to the map information in the storage part 710. Subsequently, the road width information is acquired by the acquisition part 730A to send it to the determination part 740, which determines the arrival ranges of the vehicle-evocative sounds to be outputted outside the vehicle. Subsequently the control part 750 calculates audio volume settings for the vehicle-evocative sounds to be outputted from the left and right speakers of the sound output part 760 on the basis of thus determined arrival ranges. As a result, vehicle-evocative sounds having audio volumes corresponding to the audio volume settings are outputted outside the vehicle from the left and right speakers of the sound output part 760.

When determining the arrival ranges for the vehicle-evocative sounds on the basis of the type of road width information, the determination part 740 that received the road width information sent from the acquisition part 730A decides whether or not the road width is not larger than some predetermined threshold value based on the road width information. If the road width decision result is affirmative, for example, the determination part 740 determines the arrival ranges as the predetermined range, which has symmetrical range to the traveling direction of the vehicle MV. Here, the "predetermined threshold value" is determined in advance based on the experiments, experience, or the like, from the standpoint such that it is difficult for the vehicles to passé one another and the pedestrians or bicycles can be passing on both sides of the road. Moreover, the "predetermined range" is determined in advance based on the experiment, simulation, experience, or the like, from the standpoint for alerting the attention of the approach of the vehicle to the pedestrian or bicycle on either side of a road of which width is not larger than the predetermined threshold value.

On the other hand, if the road width decision result is negative, the determination part 740 decides whether the vehicle is traveling on the road supposed to have the opposite vehicle lane, referring to the map information in the storage part 710 on the basis of the current position. If the opposite vehicle lane decision result is negative, the determination part 740 determines the broader range for the side on which the pedestrian or the like may be present than the predetermined range as the vehicle-evocative sound arrival range; because there is a possibility that the pedestrian or the like may be closely present against the traveling direction of the vehicle MV. For example, the side means the left side in a country where drivers keep to the right side of the road under a law, and the right side in the country where drivers keep to the right side of the road under the law. On the other hand, if the decision result is affirmative, the determination part 740 determines the range, of which area becomes minimal on the opposite lane side, as the arrival range. Namely, in the opposite lane side, it is assumed that no pedestrian or the like are present, because there is low possible presence of them <<Control of the Arrival Ranges for the Vehicle-Evocative Sound in Consideration of the Distance to an Intersection>>

Next, "control of the arrival ranges for the vehicle-evocative sound considering the distance to an intersection" is explained, which may be combined with the control of the arrival ranges for the vehicle-evocative sound based on the vehicle lane information in the first embodiment.

<Configuration>

Figure 4:
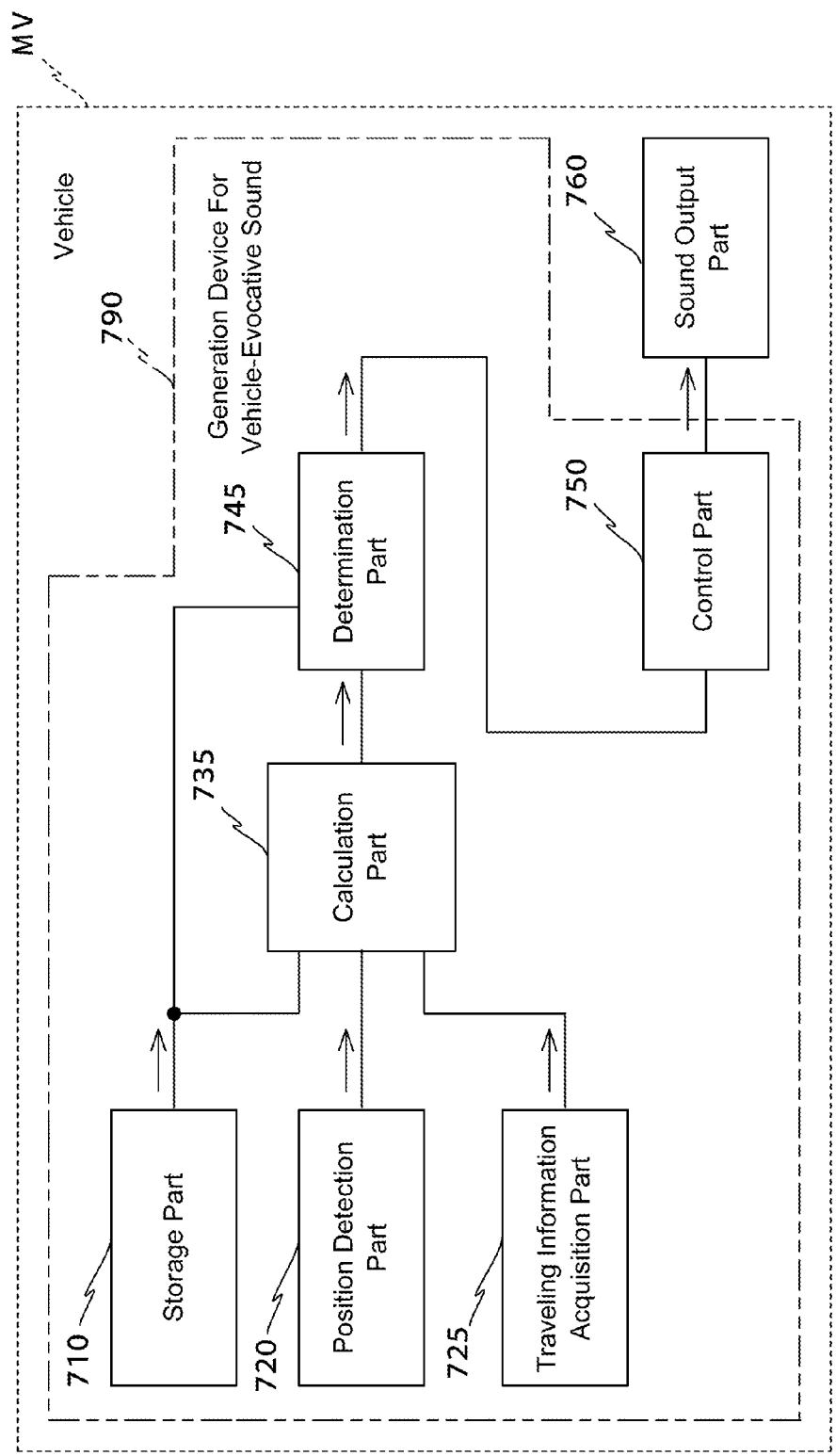
FIG. 4 is the figure for explaining the configuration of a device that controls the arrival range of the vehicle-evocative sound in consideration of distance to an intersection.

In FIG. 4, the vehicle-evocative sound generation device 790 used for the control is schematically shown. As shown in FIG. 4, the vehicle-evocative sound generation device 790 is mounted to a vehicle MV similarly to the vehicle-evocative sound generation device 700A.

As compared to the vehicle-evocative sound generation device 700A, the vehicle-evocative sound generation device 790 is different in the features that it lacks the acquisition part 730A, it comprises the determination part 745 instead of the determination part 740, and it further comprises the traveling information acquisition part 725 and a calculation part 735. In the following, the configuration is explained principally focusing on these points.

The traveling information acquisition part 725 acquires the traveling direction of the vehicle MV to send it to the calculation part 735.

The calculation part 735 receives the current position of the vehicle MV sent from the position detection part 720 and the traveling direction of the vehicle MV sent from the traveling information acquisition part 725. The calculation part 735 calculates the distance to be traveled in the traveling direction to the intersection of the road upon which the vehicle MV is traveling and another road (hereinafter, also sometimes termed the "calculated distance"), referring to the map information in the storage part 710 based on the current position and the traveling direction of the vehicle MV. The calculated distance is sent to the determination part 745.

The determination part 745 determines the arrival ranges for the vehicle-evocative sounds to be outputted outside the vehicle by the sound output part 760 on the basis of the calculated distance sent from the calculation part 735 and the map information in the storage part 710. Thus determined arrival ranges for the vehicle-evocative sounds are sent to the control part 750. Note that the determination processing performed by the determination part 745 is described hereinafter.

<Operation>

Next, the operation of the vehicle-evocative sound generation device 790 having the above-mentioned configuration is explained. Note that the current position of the vehicle MV is detected by the position detection part 720 to be periodically sent to the calculation part 735. Moreover, the traveling direction of the vehicle MV is periodically acquired by the traveling information acquisition part 725 to be sent to the calculation part 735.

Upon receipt of the current position and the traveling direction of the vehicle MV, the calculation part 735 calculates the running distance by intersection of the road, upon which the vehicle MV is traveling, and another road in the traveling direction, referring to the map information in the storage part 710. The calculation part 735 then sends the calculated distance to the determination part 745.

Upon receipt of the calculated distance from the calculation part 735, the determination part 745 decides whether or not the calculated distance is not lager than the predetermined distance, an intersection position distance. If the intersection position distance decision result is negative, the determination part 745 determines the arrival ranges for the vehicle-evocative sounds as the ranges determined without considering the existence of the intersection. For example, if the vehicle lane information is similarly supplied to the determination part 745 to that of the determination part 74, the arrival range for the vehicle-evocative sounds may be decided as those done by the determination part 740.

On the other hand, if the intersection position distance decision result is affirmative, the determination part 745 decides whether the other road that intersects with the road on which the vehicle is traveling extends to the left or right side, or to both sides, referring to the map information stored in the storage part 710. If the other road extends only to the left side, the determination part 745 determines the range as the arrival range, which is broader in left side and the traveling direction of the vehicle MV than that decided in the negative result, and includes at least the intersection position.

Moreover, if the other road extends only to the right side, the determination part 745 determines the range as the arrival range, which is broader in right side and the traveling direction of the vehicle MV than that decided in the negative result, and includes at least the intersection position. Furthermore, if the other road extends to both of the side, the determination part 745 determines the range, which is symmetrically broader in both sides and the traveling direction of the vehicle MV than that decided in the negative result, and includes at least the intersection position close to the vehicle MV.

Note that determination part 745 determines the smaller arrival range depending on the shorter calculated distance in the vehicle-evocative sound generation device 790. It determines the same range as that determined in the negative decision result of the intersection position distance, in the time point of the calculation distance is "0".

The arrival range is thus determined, then the determination part 745 sends the determined arrival ranges to the control part 750. Upon receipt of the arrival range, the control part 750 calculates audio volume settings matching to the arrival range. Thus the set audio volume is calculated, and then the control part 750 sends the volume to the sound output part 760. Upon receipt of the volume, the sound output part 760 outputs the vehicle-evocative sound from the speakers outside the vehicle MV, adjusting the volumes according to the audio volume settings.

As explained above, according to the vehicle-evocative sound generation device 790, the output of vehicle-evocative sound considering that the pedestrians and so on are closely present to the intersection is properly controlled, when the distance of the position between of the vehicle MV and the intersection with another road in the traveling direction of the vehicle MV becomes shorter than the predetermined distance.

Note that it is assumed that the predetermined distance utilized for deciding the intersection position distance is predetermined certain value in the vehicle-evocative sound generation device 790. In contrast, the determination part 745 may calculate the distance depending on the detected vehicle speed as the predetermined distance, from the standpoint to secure the time period until the intersection position for effectively warning the approach of the vehicle MV by using the vehicle-evocative sound.

Furthermore, it is possible for the vehicle-evocative sound generation device 790 to make the same alterations as those for the vehicle-evocative sound generation device 700A modifying to the devices 700B and 700C. Namely, in the configuration comprising the server device and the terminal device, the terminal device mounted to the vehicle MV essentially should include the control part 750, and either one of the server device or the terminal device may comprise each of the storage part 710, the position detection part 720, the traveling information acquisition part 725, the calculation part 735, and the determination part 745.

The Second Embodiment

Next, the second embodiment of the present invention is explained with reference to FIG. 5.

<Configuration>

Figure 5:
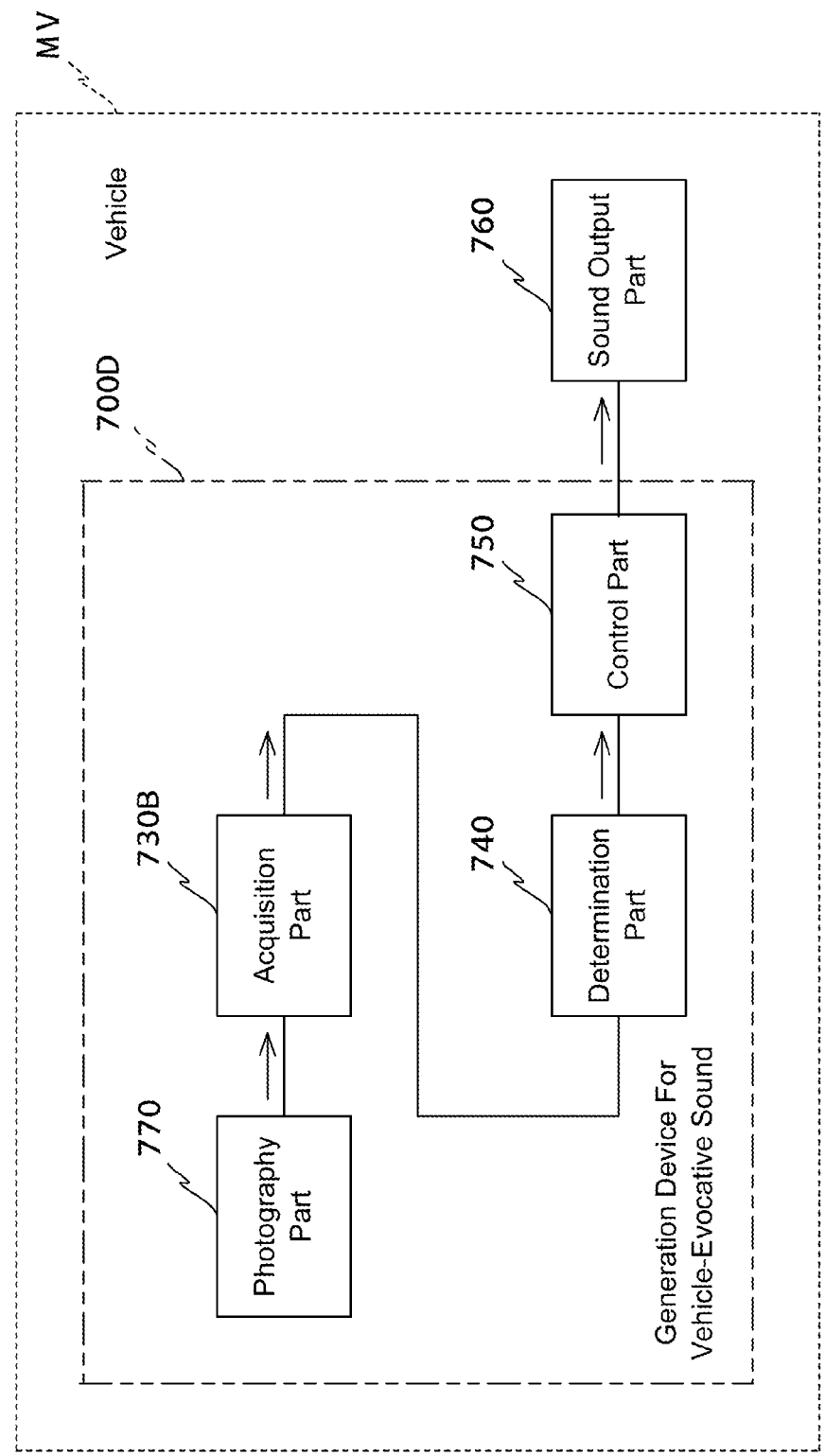
FIG. 5 is the block diagram for explaining the configuration of the vehicle-evocative sound generation device of the second embodiment of the present invention.

FIG. 5 shows the schematic configuration of a generation device for vehicle-evocative sound 700D according to the second embodiment. As shown in FIG. 5, the vehicle-evocative sound generation device 700D is mounted to a vehicle MV as the same as the device 700A.

As compared to the vehicle-evocative sound generation device 700A, the vehicle-evocative sound generation device 700D is different in the feature wherein it comprises a photography part 770 instead of the storage part 710 and the position detection part 720, and also comprises an acquisition part 730B instead of the acquisition part 730A. In the following, the configuration is explained principally focusing on these features.

The photography part 770 is composed of a camera device for photographing the surroundings of the vehicle MV. The photographic images obtained as the results by being taken with the photography part 770 are sent sequentially to the acquisition part 730B.

The acquisition part 730B receives the photographic images from the photography part 770. The acquisition part 730B then analyzes the photographic images to acquire the vehicle lanes number information on the road along which the vehicle MV is traveling and the information whether the presence or absence of one or more opposite vehicle lanes. Thus obtained the information of the vehicle lane number and the information whether the opposite vehicle lane is present are sent to the determination part 740 as the vehicle lane information.

<Operation>

Next, the operation of the vehicle-evocative sound generation device 700D having the above-mentioned configuration is explained. Note that it is assumed that the photography part 770 takes photograph images around the vehicle MV, and sequentially sends them to the acquisition part 730B.

Upon receipt of the photographic image sent from the photography part 770, the acquisition part 730B analyzes the photographic image to acquire the information whether the opposite vehicle lane is present and the information of the vehicle lane number for the road along which the vehicle MV is traveling. Thus acquired information is sent to the determination part 740 as vehicle lane information.

After that, the arrival ranges determination by the determination part 740 and the set audio volume calculation by the control part 750 on the basis of the determined arrival ranges are performed as the same as those in the first embodiment. The sound output part 760 outputs vehicle-evocative sounds to the outside of the vehicle MV from the speakers, control the audio volume according to the calculated set audio volumes.

As explained above, in the second embodiment, the acquisition part 730B analyzes the photographic images around the vehicle MV sent from the photography part 770 to acquire the vehicle lane information, which includes the information of the vehicle lane numbers on the road upon which the vehicle MV is traveling. Subsequently, the acquisition part 730B sends the acquired vehicle lane information to the determination part 740. The determination part 740 then determines the arrival ranges for the vehicle-evocative sounds to be outputted to the outside of the vehicle on the basis of the vehicle lane information sent from the acquisition part 730B. Subsequently, on the basis of the determined arrival ranges, the control part 750 calculates the set audio volumes for the vehicle-evocative sounds to be outputted from the left and right speakers of the sound output part 760. As a result, the vehicle-evocative sounds are outputted to the outside of the vehicle from the speakers of the sound output part 760 at audio volumes corresponding to the set audio volumes.

Thus, according to the second embodiment, the output of the vehicle-evocative sound during traveling is controlled, considering the possibility for the existence of the subject such as human in the circumstances that change depending on the classes of the road, namely, vehicle lane numbers, as is the case with the first embodiment.

Furthermore, according to the second embodiment, the part 740 determines the arrival ranges as the predetermined range, which has symmetrical range to the traveling direction of the vehicle MV as is the case with the first embodiment. If the number is plural, it determines the arrival range, which has the broader range in the side wherein it is highly possible that the pedestrian or the like is closely present against the traveling direction of the vehicle MV as the predetermined range. Furthermore, if there is the opposite lane, the determination part 740 determines the arrival range, which has the narrower range in the opposite lane side wherein it is less possible that the pedestrian or the like is present against the traveling direction of the vehicle MV, as the predetermined range.

Due to this, in the second embodiment, the vehicle-evocative sound may be output at a reasonable output audio volume control, considering the presence of the subject to be alerted.

It may be possible to modify for the second embodiment as the same as those for the first embodiment. Namely, similar to modify the vehicle-evocative sound generation device 700A to the devise 700B or 700C, the configuration comprises the server device and the terminal device may be employed. In this case, it is essential for the terminal device, which is mounted on the vehicle MV, to comprise the control part 750 and the photography part 770. However, either the server device or the terminal device may comprise each of the acquisition part 730B, and the determination part 740.

Furthermore, in the second embodiment, the photography part is separately provided. However, instead of it, the photography result by using the photographic device that is already present within the vehicle (for example, a front onboard camera or a cell phone with a photography function, or the like)

Yet further, it may also combine "control of the arrival range of the vehicle-evocative sound while giving consideration to the distance to an intersection" with the second embodiment as well, as is the case with the first embodiment.

Note that that the vehicle lane information includes the vehicle lane number information and the information whether the opposite vehicle lane is present in the first and second embodiments. However, the vehicle lane information may further include running lane information for the lane on which the vehicle MV is traveling. In this case, the determination part determines the arrival ranges for the vehicle-evocative sound according to the distance depending on the distance between the vehicle MV and the position at which the possibility for the presence of pedestrian or the like, a person to be alerted, is high, when the vehicle is traveling the multilane without the opposite lane. Then, the vehicle-evocative sound may be output for matching the determined arrival range.

Moreover, the vehicle-evocative sound generation device of the first and second embodiments may be configured as the computer device incorporating the computer as the calculation part to achieve the practical use by executing the program to substitute functions of the acquisition parts 730A and 730B, the determination part 740, and of the control part 750. These programs may be acquired in the form of the recording medium such as a CD-ROM or a DVD or the like on which they are stored, or the form of distribution via a network such as the internet or the like.

EXAMPLES

In the following, examples of the vehicle-evocative sound generation device of the present invention are explained with reference to FIGS. 6 to 15. Note that the same reference symbols are appended to the same or equivalent elements to omit the duplicated explanation in the following explanation and drawings.

The First Example

Firstly, the first example is explained with reference to FIGS. 6 through 11.

<Configuration>

Figure 6:
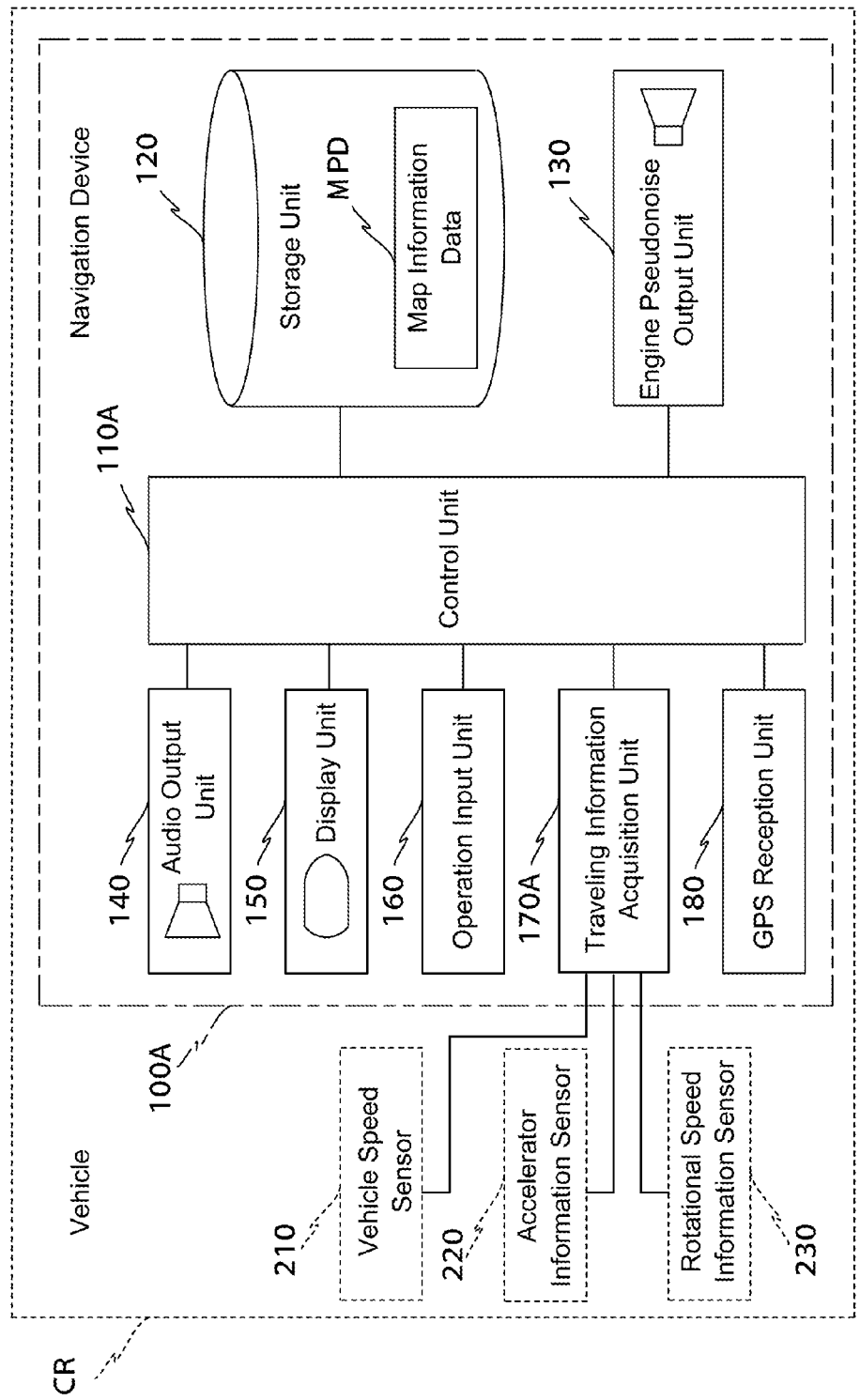
FIG. 6 is the block diagram for explaining the configuration of a navigation device of the first example of the present invention.

FIG. 6 schematically shows the configuration of a navigation device 100A having the function as the vehicle-evocative sound generation device of the first example. Note that the navigation device 100A is one feature of the vehicle-evocative sound generation device 700A of the first example (see FIG. 1).

The navigation device 100A is mounted to a vehicle CR having an electric motor as a drive mechanism for traveling upon the road. A vehicle speed sensor 210, an accelerator information sensor 220, and a rotational speed information sensor 230 being connected to the navigation device 100A are installed to the vehicle CR.

Here, the vehicle speed sensor 210 detects the rotation of a wheel or an axle of the vehicle CR. The accelerator information sensor 220 detects a press amount of the accelerator or the like corresponding to the accelerator position. Furthermore, the rotational speed information sensor 230 detects the rotational speed of the electric motor.

As shown in FIG. 6, the navigation device 100A comprises a control unit 110A, a storage unit 120 as the storage part 710, and an engine pseudonoise output unit 130 as the sound output part 760. Moreover, the navigation device 100A comprises an audio output unit 140, a display unit 150, and an operation input unit 160. The navigation device 100A further comprises a traveling information acquisition unit 170A and a GPS reception unit 180 as a portion of the position detection part 720.

The control unit 110A integrates and controls the entire navigation device 100A. The control unit 110A is described hereinafter.

The storage unit 120 is composed of a non-volatile storage device such as a hard disk device and the like. The storage unit 120 stores a variety of data such as road network data being employed in the navigation device 100A, map information data MPD including the information data of the vehicle lane number and the data whether the opposite vehicle lane is present and so on. The control unit 110A may access the storage unit 120.

The engine pseudonoise output part 130 receives accelerator information AR, rotational speed information ER, and set audio volumes $VLC_L$ and $VLC_R$, which are sent from the control unit 110A. The engine pseudonoise output unit 130 generates engine pseudonoise on the basis of the accelerator information AR, the rotational speed information ER, and the set audio volumes $VLC_L$ and $VLC_R$ to output the outside of the vehicle. The configuration of the engine pseudonoise output unit 130 is described in detail hereinafter.

The audio output unit 140 comprises a speaker and so on, and outputs audio sound corresponding to audio data received from the control unit 110A to inside of the passenger compartment. Under the control by the control unit 110A, the audio output unit 140 outputs the voice inside of the passenger compartment for guidance relating to the traveling direction of the vehicle CR, traveling conditions, traffic conditions, change of the planned travel route, and so on.

The display unit 150 comprises a display device such as a liquid crystal panel or the like to display images corresponding to the display data received from the control unit 110A. Under the control by the control unit 110A, the display unit 150 displays images such as map information and route information and so on, and guidance information and so on.

The operation input unit 160 comprises a key part being provided to a main body portion of the navigation device 100A, and/or a remote input device including the key part or the like. Here, a touch panel being provided to the display device of the display unit 150 may be used as the key part being provided to the main body portion. Note that the configuration utilizing a voice recognition technique for voice input operation may be employed, instead of, or as well as, providing a key part.

Settings of operational details and issuing of operational instruction to the navigation device 100A are performed by the user operating the operation input unit 160. For example, settings such as designation of a destination and selection of one travel route among searched paths and so on may be established by the user employing the operation input unit 160. Such a type of input content is sent from the operation unit 160 to the control unit 110A as operation input data.

The traveling information acquisition unit 170A comprises the acceleration sensor, the angular velocity sensor and so on to detect the acceleration and the angular velocity, both of which are mounted on the vehicle CR. Moreover, the traveling information acquisition unit 170A receives the detection results sent from the vehicle speed sensor 210, the accelerator information sensor 220, and the rotational speed information sensor 230 mounted to the vehicle CR to convert them to a format to be handled in the control unit 110A. Each data thus obtained from the detection or conversion in the traveling information acquisition unit 170A is sent to the control unit 110A as traveling data.

The GPS reception unit 180 calculates the current position of the vehicle CR on the basis of radio waves received from a plurality of GPS satellites. Moreover, the GPS reception unit 180 checks the current time on the basis of the date and time information sent from the GPS satellites. Information related to the current position and current time is sent to the control unit 110A as GPS data.

Next, the control unit 110A is explained. The control unit 110A comprises a central processing device (CPU) and peripheral circuitry thereof. Execution of a variety of the programs by the control unit 100A substitutes functions of a portion of the position detection part 720 as mentioned above, the acquisition part 730A, the determination part 740, and the control part 750.

The control unit 110A performs processing to supply navigation information to the user on the basis of the traveling data sent from the traveling information acquisition unit 170A and the GPS data sent from the GPS reception unit 180, referring to data in the storage unit 120 as appropriate. The processing to supply navigation information includes: (a) map display for displaying a map of a region designated by the user on the display unit 150; (b) map matching for calculating the position of the vehicle CR on the map and direction to face to display the information on the display device of the display unit 150 so as to show them to the user; and (c) processing for control of a guidance to provide an proper advice of the direction and route to take and the like for the display device of the display unit 150; and processing the control for outputting voice from the speaker of the audio output part 140 to provide the guidance.

Moreover, the control unit 110A calculates the set audio volumes $VLC_L$ and $VLC_R$ on the basis of the map matching result and the map information data MPD to send the set audio volumes $VLC_L$ and $VLC_R$ to the engine pseudonoise output part 130. The calculation processing is described hereinafter.

Note that the control unit 110A sends acquired results of the accelerator information and the rotational speed information to the engine pseudonoise output part 130 as the accelerator information AR and the rotational speed information ER.

Figure 7:
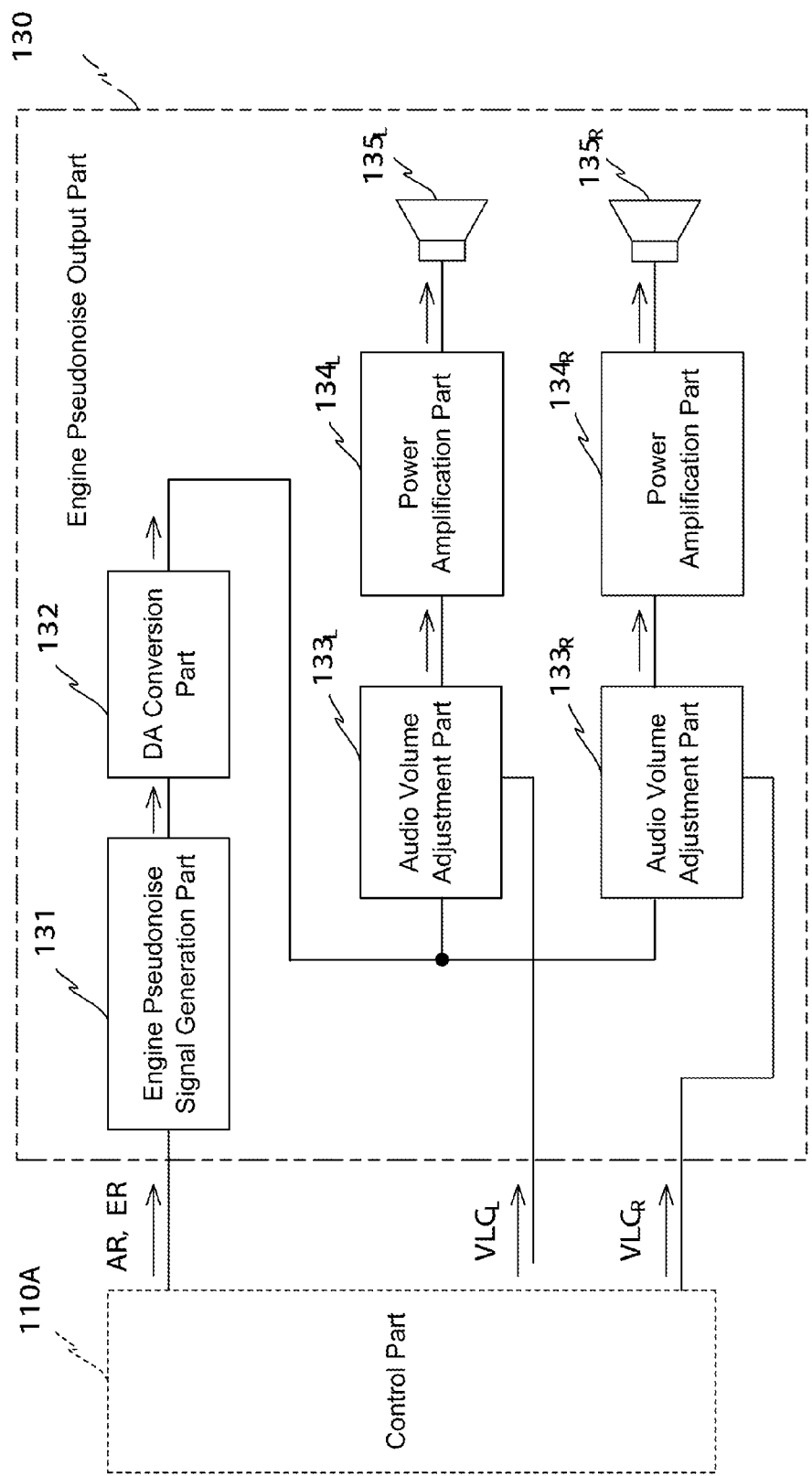
FIG. 7 is the figure for explaining the configuration of an engine pseudonoise output part of FIG. 6.

Next, the configuration of the engine pseudonoise output part 130 is explained. As shown in FIG. 7, the engine pseudonoise output unit 130 comprises an engine pseudonoise signal generation part 131 and a DA (Digital to Analog) conversion part 132. Moreover, the engine pseudonoise output unit 130 comprises the audio volume adjustment parts $133_L$ and $133_R$; power amplification parts $134_L$ and $134_R$, and speakers $135_L$ and $135_R$.

The engine pseudonoise signal generation part 131 holds internally a waveform table in which waveform patterns are registered, wherein the waveform pattern is associated with combinations of the accelerator information and the rotational speed information. The part 131 receives the accelerator information AR and the rotational speed information ER sent from the control unit 110A. Subsequently, the engine pseudonoise signal generation part 131 reads out the registered waveform pattern in the internal waveform table associated with the combination of accelerator information AR and rotational speed information ER. Then, the engine pseudonoise signal generation part 131 generates the engine pseudonoise signals, digital signals, on the basis of the waveform pattern. Thus generated engine pseudonoise signal is sent to the DA conversion unit 132.

The DA conversion unit comprises a DA converter. The DA conversion part 132 receives the engine pseudonoise signals sent from the engine pseudonoise signal generation unit 131. The DA conversion part 132 then converts the engine pseudonoise signals into analog signals. The converted analog signals obtained by the conversion in the DA conversion part 132 are sent to the audio volume adjustment parts $133_L$ and $133_R$.

Each of the audio volume adjustment parts $133_L$ and $133_R$ comprises an electronic volume element and so on. The audio volume adjustment parts $133_L$ and $133_R$ perform audio volume adjustment processing on the converted analog signals sent from the DA conversion part 132, according to the set audio volumes $VLC_L$ and $VLC_R$ sent from the control unit 110A. Audio volume adjustment signals, the controlled results by the audio volume adjustment parts $133_L$ and $133_R$ are sent to the power amplification part $134_L$ and $134_R$ respectively.

Each of the power amplification parts $134_L$ and $134_R$ includes a power amplifier. The power amplification parts $134_L$ and $134_R$ receive the audio volume adjustment signals sent from the audio volume adjustment parts $133_L$ and $133_R$. The power amplification part $134_L$ power-amplifies the audio volume adjustment signal sent from the audio volume adjustment part $133_L$. Moreover, the power amplification part $134_R$ power-amplifies the audio volume adjustment signal sent from the audio volume adjustment part $133_R$. The output sound signals, the amplification results by the power amplification parts $134_L$ and $134_R$, are sent to the speakers $135_L$ and $135_R$ respectively.

The speaker $135_L$ is installed to the vehicle so as that its sound output direction is ahead on the left of the vehicle CR. The speaker $135_L$ outputs the engine pseudonoise to the ahead on the left of the vehicle CR, according to the output sound signal sent from the power amplification part $134_L$.

The speaker $135_R$ is installed to the vehicle so as that its sound output direction is ahead on the right of the vehicle CR. The speaker $135_R$ outputs the engine pseudonoise to the ahead on the right of the vehicle CR, according to the output sound signal sent from the power amplification part $134_R$.

[Operation]

The operation of the navigation device 100A having a configuration as mentioned above is explained principally focusing on the processing by the control unit 110A during engine pseudonoise generation. Note that the vehicle speed sensor 210, the accelerator information sensor 220, and the rotational speed information sensor 230 are performing their detection operations, and the detection results are sent to the navigation device 100A. Furthermore, each time the control unit 110A receives the detection results by the accelerator information sensor 220 and the rotational speed information sensor 230, it immediately sends accelerator information AR and rotational speed information ER reflecting the detection results to the engine pseudonoise output part 130.

Figure 8:
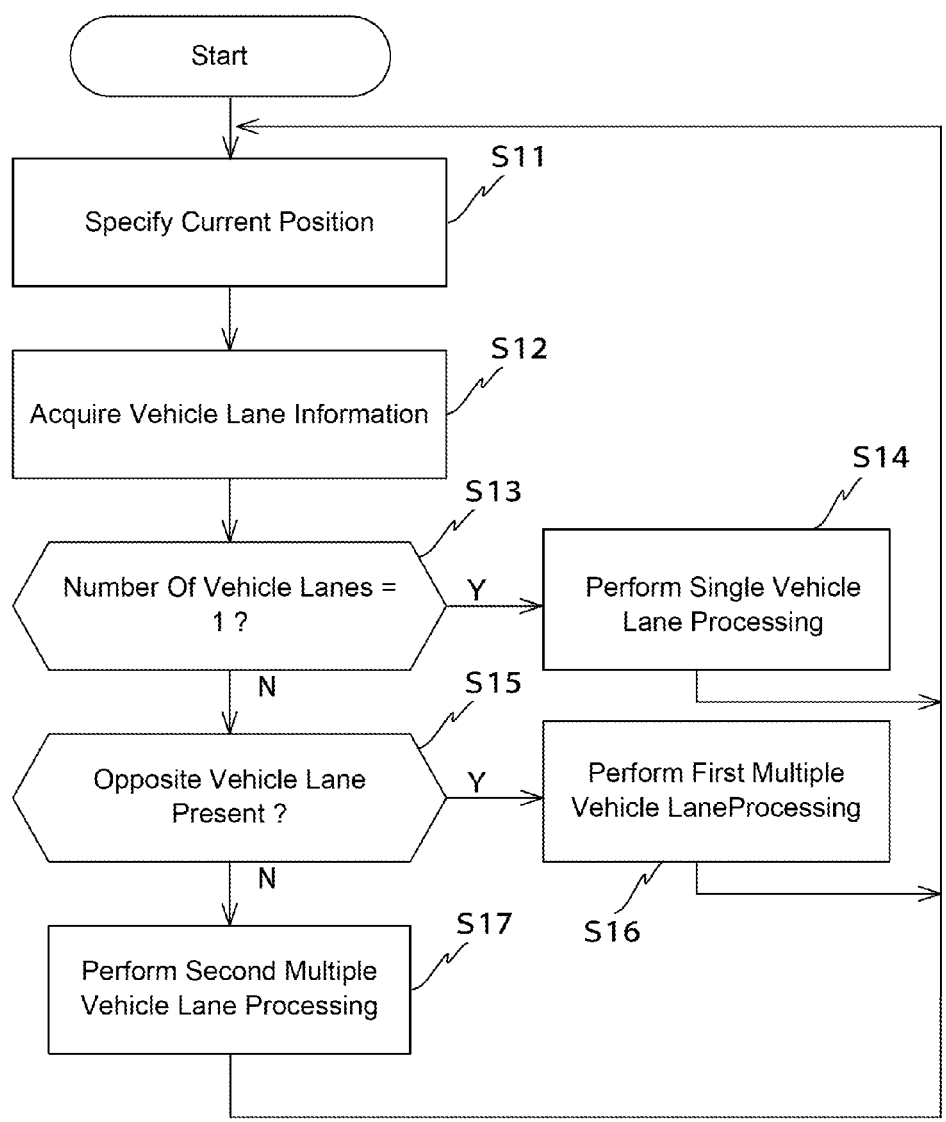
FIG. 8 is a flow chart for explaining a pseudonoise generation control procedure performed by a control unit of FIG. 6.

As shown in FIG. 8, the control unit 110A firstly specifies the current position of the vehicle CR on the basis of the map matching result in the step S11. Subsequently, the control unit 110A acquires the vehicle lane information on the basis of the current position of the vehicle, referring to the map information data MPD in the storage unit 120 in the step 12; wherein the vehicle lane information includes the information of the lane number of the road on which the vehicle is traveling, and the information for the opposite vehicle lane number is present in the traveling direction.

Next, in a step S13, the control unit 110A decides whether the vehicle lane number on the road on which the vehicle CR is traveling is "1". If the decision result is affirmative (Y in the step S13), the flow proceeds to a step S14. In the step S14, the control unit 110A performs single vehicle lane processing to calculate the set audio volumes $VLC_L$ and $VLC_R$.

Figure 9:
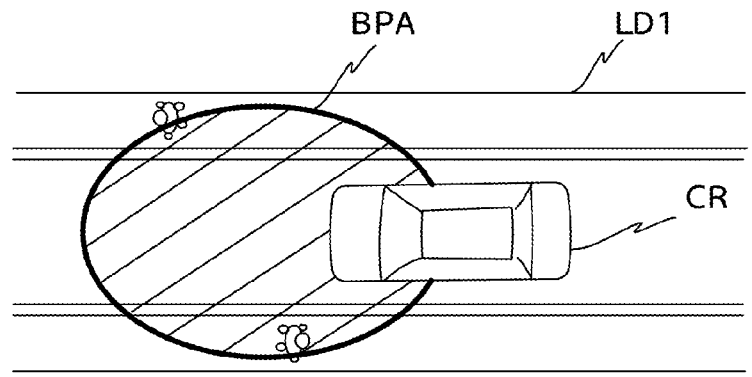
FIG. 9 is the figure for explaining the arrival range of the engine pseudonoise due to single vehicle lane processing of FIG. 8.

In the single vehicle lane processing, the control unit 110A firstly determines an arrival range BPA, which has the symmetrical range to the traveling direction of the vehicle CR, as the arrival range for the engine pseudonoise (see FIG. 9). Subsequently, the control unit 110A calculates the set audio volumes $VLC_L$ and $VLC_R$ for the speakers $135_L$ and $135_R$, corresponding to the arrival range BPA.

Note that the "arrival range BPA" is determined in advance on the basis of the experiments, simulation, experience and so on, from the standpoint for alerting the pedestrian or the bicycle on either side of the road having an average single-lane road width that the vehicle is approaching.

If the decision result in the step S13 is negative (N in the step S13), the flow proceeds to a step S15. In the step S15, the control unit 110A decides whether the opposite vehicle lane is present on the road on which the vehicle is traveling.

If the decision result in the step S15 is affirmative (Y in the step S15), the flow proceeds to a step S16. In the step S16, the control unit 110A performs the first multiple vehicle lane processing to calculate the set audio volumes $VLC_L$ and $VLC_R$.

Figure 10:
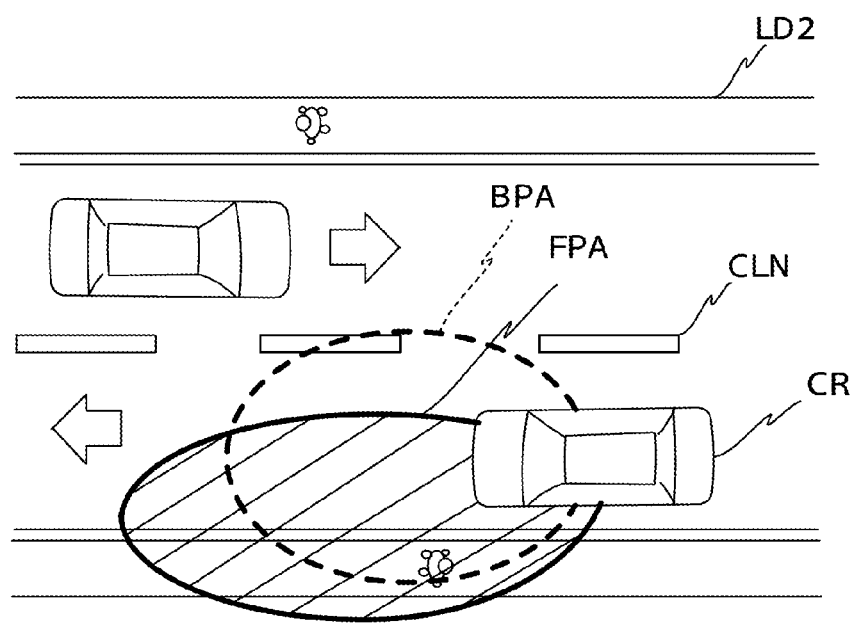
FIG. 10 is the figure for explaining the arrival range of the engine pseudonoise due to the first multiple vehicle lane processing of FIG. 8.

During the first multiple vehicle lane processing, firstly, the control unit 110A determines the range so as to become minimum in the side without the probable presence of the pedestrian or the like, and the broader range in the side on which it is highly possible that they are closely present than the arrival range BPA as the arrival range FPA see (see FIG. 10). Subsequently, the control unit 110A calculates the set audio volumes $VLC_L$ and $VLC_R$ for the speakers $135_L$ and $135_R$ corresponding to the determined arrival ranges.

Note that any engine pseudonoise is not output from the speaker on the opposite vehicle lane side in the first multiple vehicle lane processing of the first example.

If the decision result in the step S15 is negative (N in the step S15), the flow proceeds to a step S17. In the step S17, the control unit 110A performs the second multiple vehicle lane processing to calculate the set audio volumes $VLC_L$ and $VLC_R$.

Figure 11:
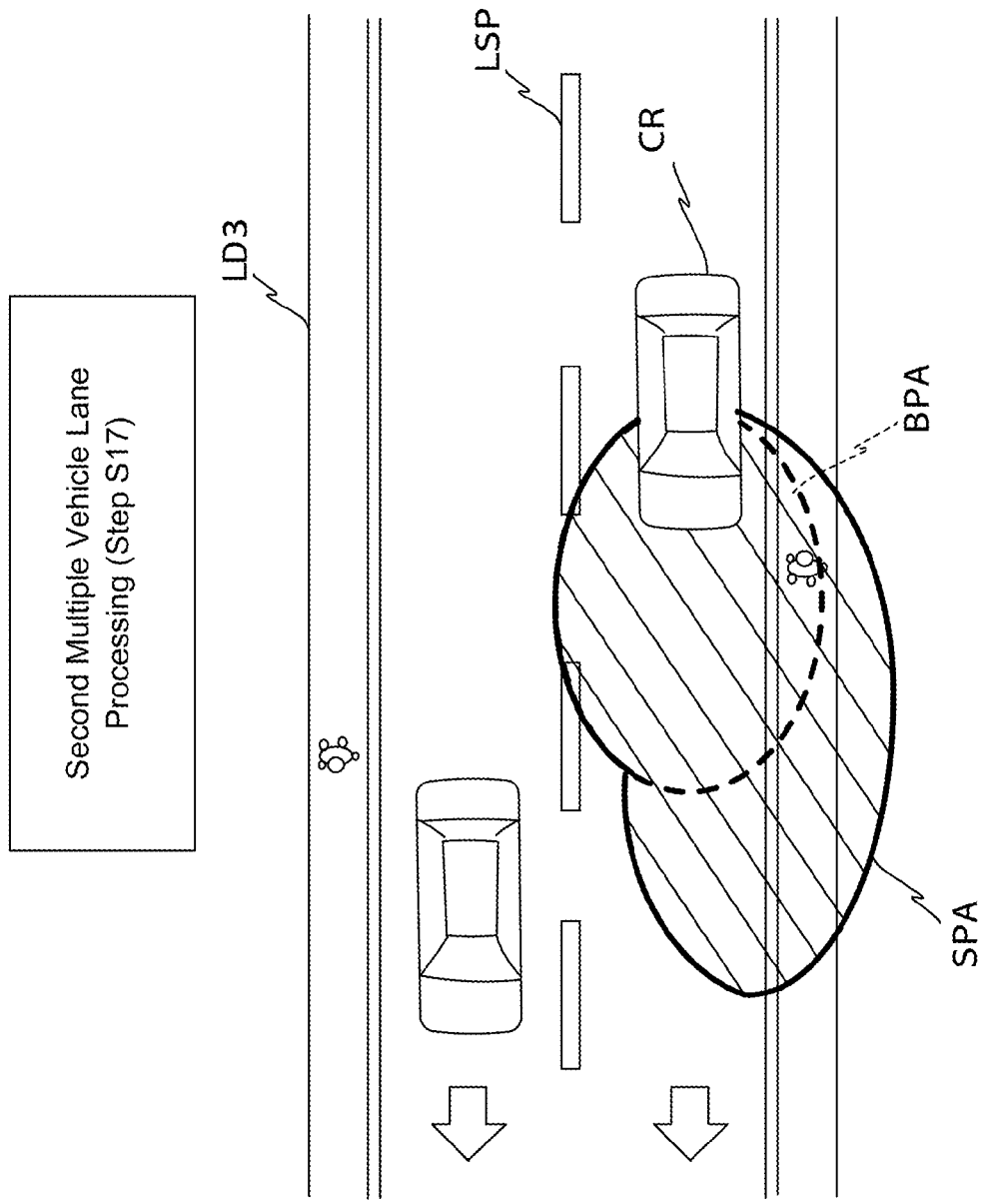
FIG. 11 is the figure for explaining the arrival range of the engine pseudonoise due to the second multiple vehicle lane processing of FIG. 8.

During the second multiple vehicle lane processing, the control unit 110A firstly determines the arrival range SPA, which is broader than the arrival range in the pedestrian side against the traveling direction of the vehicle CR, and the same as the arrival range BPA in the opposite side of the pedestrian side (see FIG. 11). Subsequently, the control unit 110A calculates the set audio volumes $VLC_L$ and $VLC_R$ for the speakers $135_L$ and $135_R$ corresponding to the determined arrival range.

When the set audio volumes $VLC_L$ and $VLC_R$ are calculated in any one of the steps S14, S16, and S17, the control unit 110A then sends the calculated set audio volumes $VLC_L$ and $VLC_R$ to the engine pseudonoise output part 130. After that, the processing of the steps S11 through S17 is repeated to sequentially calculate the set audio volumes $VLC_L$ and $VLC_R$. The calculated set audio volumes $VLC_L$ and $VLC_R$ are sent to the engine pseudonoise output part 130.

In the engine pseudonoise output unit 130, the engine pseudonoise generation part 130 generates the engine pseudonoise signals on the basis of the accelerator information AR and the rotational speed information ER sent from the control unit 110A. Subsequently, the DA conversion part 132 converts the engine pseudonoise signals into the analog-converted signals.

Next, the audio volume adjustment units $133_L$ and $133_R$ perform audio volume adjustment processing on the analog-converted signals, according to the calculated set audio volumes $VLC_L$ and $VLC_R$ by the control unit 110A. The audio volume adjustment part $133_L$ sends the audio volume adjustment result to the power-amplification part $134_L$, the audio volume adjustment part $133_R$ also sends the result to the power-amplification part $134_R$. Subsequently, the output sound signal generated by power-amplification by the power amplification part $134_L$ is sent to the speaker $135_L$, and also the output sound signal that generated by power-amplification by the power-amplification part $134_R$ is sent to the speaker $135_R$.

As a result, the engine pseudonoise is outputted from the speaker $135_L$ to the ahead on the left of the vehicle CR, following the output sound signal sent from the power amplification part $134_L$. Moreover, the engine pseudonoise is outputted from the speaker $135_R$ to the ahead on the right of the vehicle CR, following the output sound signal sent from the power amplification part $134_R$.

As explained above, in the first example, the control unit 110A acquires the vehicle lane information on which the vehicle CR is traveling on the basis of the current position of the vehicle CR, referring to the map information data MPD in the storage unit 120, wherein the vehicle lane information includes information of the vehicle lane number and the information whether the opposite vehicle lanes are present. On the basis of the acquired vehicle lane information, the control unit 110A determines the arrival range for the engine pseudonoise being outputted to the outside of the vehicle. It calculates the set audio volumes $VLC_L$ and $VLC_R$ for the engine pseudonoise outputted from the speakers $135_L$ and $135_R$ of the engine pseudonoise output part 130 on the basis of the determined arrival ranges. As a result, the engine pseudonoise at audio volumes corresponding to the set audio volumes $VLC_L$ and $VLC_R$ is outputted from the speakers $135_L$ and $135_R$ of the engine pseudonoise output part 130 to the outside of the vehicle.

Therefore, according to the first example, the output of the vehicle-evocative sound during traveling is controlled, considering the possibility for the existence of the subject that change depending on the classes of the road, namely, vehicle lane numbers.

Furthermore, in the first example, if the number of vehicle lanes is "1", the control unit 110A determines the arrival range as the predetermined range BPA having symmetrical range to the traveling direction of the vehicle CR. If the number is plural, the control unit 110A determines the arrival range, which has the broader that the predetermined range BPA in the side wherein it is highly possible that the pedestrian or the like is closely present against the traveling direction of the vehicle MV as the predetermined range. Furthermore, if there is the opposite lane, the control unit 110A determines the arrival range, which so as to become minimum in the opposite lane side as the range wherein it is less possible that the pedestrian or the like is present against the traveling direction of the vehicle MV, as the predetermined range.

Due to this, according to the first example, the output of the vehicle-evocative sound during traveling is controlled, considering the possibility for the existence of the subject that change depending on the classes of the road, namely, vehicle lane numbers.

The Second Example

Figure 12:
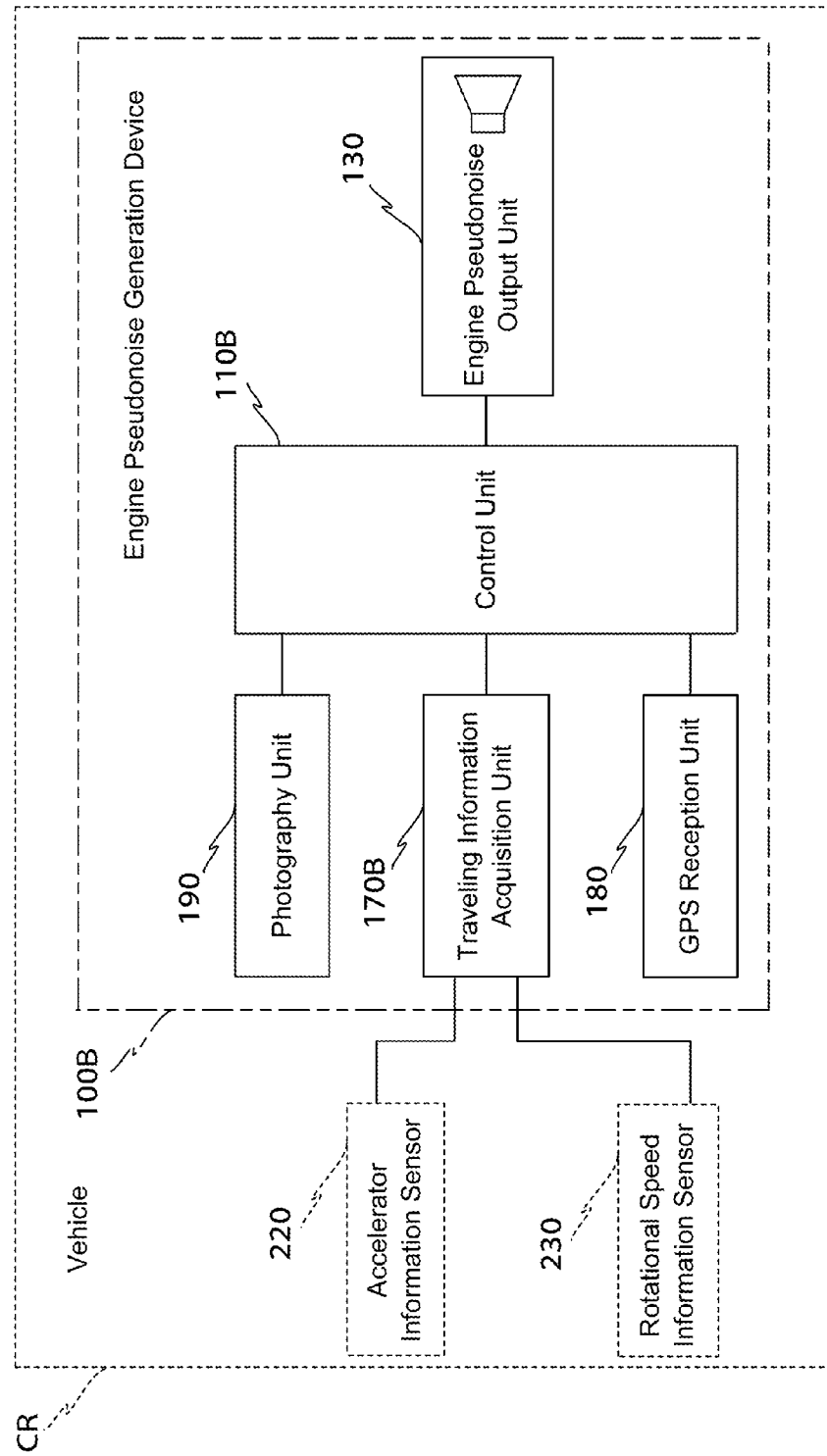
FIG. 12 is the block diagram for explaining the configuration of the engine pseudonoise generation device of the second example of the present invention.

Next, the second example is explained with reference to FIGS. 12 through 15.
<Configuration>
FIG. 12 schematically shows the configuration of the engine pseudonoise generation device 100B as a vehicle-evocative sound generation device according to a second example. Note that the engine pseudonoise generation device 100B is one aspect of the vehicle-evocative sound generation device 700D of the second example (see FIG. 5).

As the same as the navigation device 100A, the engine pseudonoise generation device 100B employs the electric motor as the drive mechanism and is mounted to a vehicle CR that is traveling on the road. The accelerator information sensor 220 and the rotational speed information sensor 230 are connected to the navigation device 100A are mounted to the vehicle CR.

As shown in FIG. 12, the engine pseudonoise generation device 100B comprises the control unit 110B and the engine pseudonoise output part 130 as the sound output part 760. Moreover, the engine pseudonoise generation device 100B comprises the traveling information acquisition unit 170B, the GPS reception unit 180 as the position detection part 720, and the photography part 190 as the photography part 770.

The control unit 110B integrates and controls the entire engine pseudonoise generation device 100B. The control unit 110B is described hereinafter.

The traveling information acquisition unit 170B receives the detection results sent from the accelerator information sensor 220 and the rotational speed information sensor 230 mounted to the vehicle CR. It converts the detection results sent from the sensors into the format to be handled by the control unit 110B. Thus obtained data obtained by conversion in the traveling information acquisition unit 170B is respectively sent to the control unit 110B as traveling data.

The photography unit 190 comprises a camera device for photographing around the vehicle CR. The photographic image data, the result of the photography by the photography unit 190, is sent sequentially to the control unit 110B.

Next, the control unit 110B is explained. The control unit 110B comprises the central processing device (CPU) and peripheral circuitry thereof. The functions of the acquisition part 730B, the determination part 740, and the control part 750 are implemented by the control unit 110B executing programs of various types.

The control unit 110B receives the photographic images data from the photographic unit 190. The control unit 110B analyzes the photographic images to acquire vehicle lane information, including the information of vehicle lane number and the information of the presence for the opposite lanes, and the position information on the running lane of the road, on which the vehicle CR is traveling. The control unit 110B calculates the set audio volumes $VLC_L$ and $VLC_R$ on the basis of the acquired vehicle lane information to send the calculated set audio volumes $VLC_L$ and $VLC_R$ to the engine pseudonoise output part 130. The calculation processing is described hereinafter.

Note that the control unit 110B sends the acquired results of the accelerator information and the rotational speed information to the engine pseudonoise output part 130 as the accelerator information AR and the rotational speed information ER.
<Operation>
The operation of the engine pseudonoise generation device 100B having the above-mentioned configuration is now explained, principally focusing on the processing by the control unit 110B during engine pseudonoise generation. Note that the accelerator information sensor 220 and the rotational speed information sensor 230 are performing their detection operation, and the detection results are sent to the engine pseudonoise generation device 100B. Moreover, the photography unit 190 takes photograph around the vehicle CR, and the photographing results are sequentially sent to the control unit 110B. Furthermore, each time it receives the detection results by the accelerator information sensor 220 and the rotational speed information sensor 230, the control unit 110B immediately sends accelerator information AR and rotational speed information ER, reflecting the detection results to the engine pseudonoise output part 130.

Figure 13:
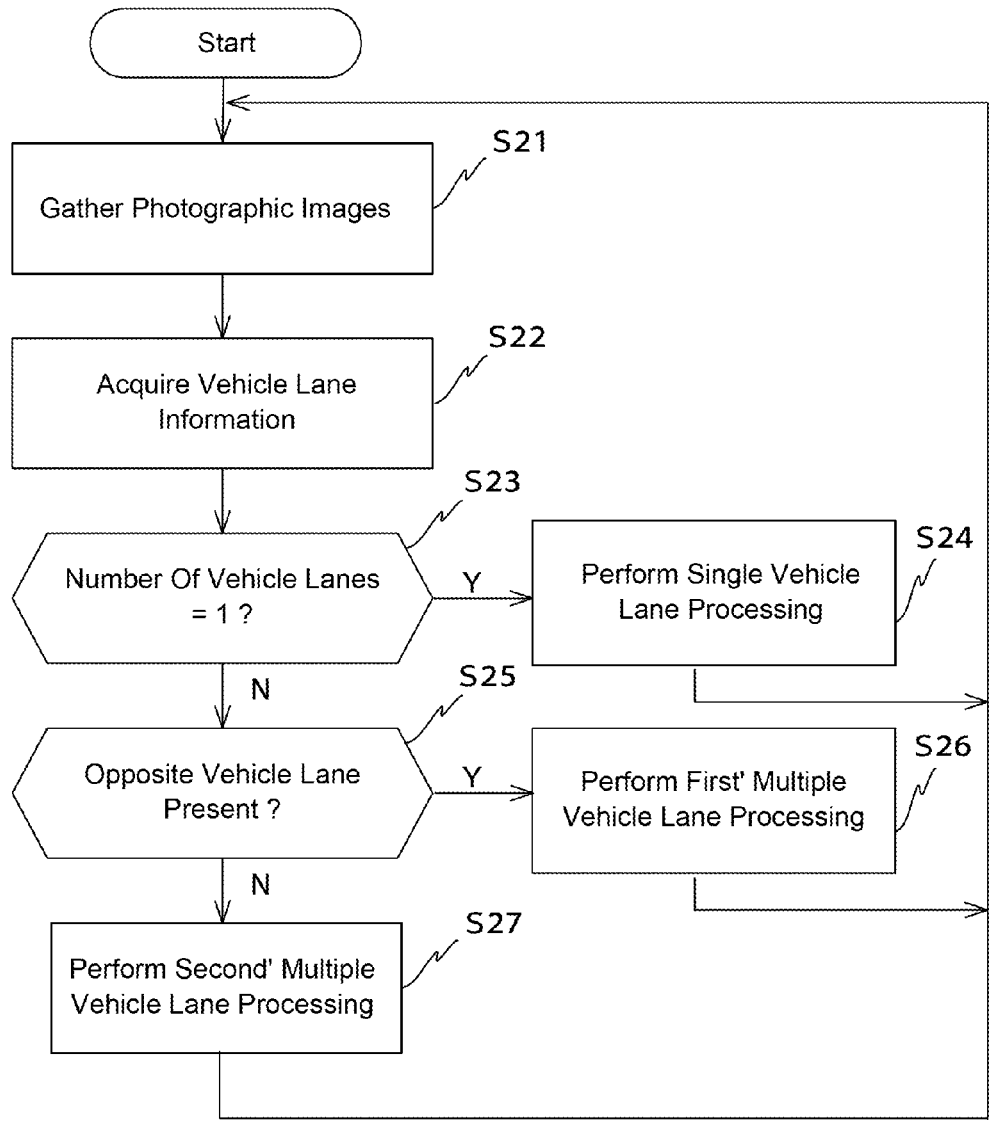
FIG. 13 is the flow chart for explaining a pseudonoise generation control procedure performed by a control unit of FIG. 12.

During the engine pseudonoise generation control, as shown in FIG. 13, firstly, in a step S21, the control unit 110B collects the photographic image data newly sent from the photography unit 190. Subsequently, in a step S22, the control unit 110B analyzes the newly collected photographic image data to acquire the vehicle lane information, including the information of the vehicle lane number and the information of opposite vehicle lane presence in the traveling direction of the road on which the vehicle CR is traveling, and the position information of the running lane.

Next, in a step S23, the control unit 110B decides whether the vehicle lane number on the road on which the vehicle CR is traveling is "1". If the decision result is affirmative (Y in the step S23), the flow proceeds to a step S24. In the step S24, as the same as in the step S14, the control unit 110B performs single vehicle lane processing to calculate the set audio volumes $VLC_L$ and $VLC_R$.

If the decision result in the step S23 is negative (N in the step S23), the flow proceeds to a step S25. In the step S25, the control unit 110B decides whether the opposite vehicle lane is present on the road upon which the vehicle is traveling.

If the decision result in the step S25 is affirmative (Y in the step S25), the flow proceeds to a step S26. In the step S26, the control unit 110B performs the first' multiple vehicle lane processing, which is a modified first multiple vehicle lane processing in the step S16, to calculate the set audio volumes $VLC_L$ and $VLC_R$.

During the first' multiple vehicle lane processing, firstly, the control unit 110B decides a vehicle lane position whether the vehicle lane upon which the vehicle CR is traveling is the closest lane to the pedestrian side, namely, whether the vehicle lane is the outermost vehicle lane on the road. For example, if there is single vehicle lane available for the vehicle CR to travel upon in the current traveling direction, the result of the vehicle lane position decision is affirmative.

If the result of the vehicle lane position decision is affirmative, the control unit 110B determines the arrival ranges for engine pseudonoise as the same ranges of the step S16. On the other hand, if the result is negative, the control unit 110B determines the arrival ranges for engine pseudonoise so as to minimum. Subsequently, the control unit 110B calculates the set audio volumes $VLC_L$ and $VLC_R$ for the speakers $135_L$ and $135_R$ corresponding to the thus determined arrival ranges.

Note that, in the second example, if the result of the vehicle lane position decision processing in the first' multiple vehicle lane processing is negative, it is performed the audio volume setting that the engine pseudonoise is not outputted to the outside of the vehicle from either the speaker $135_L$ or the speaker $135_R$.

If the decision result in the step S25 is negative (N in the step S25), the flow proceeds to a step S27. In the step S27, the control unit 110B performs second' multiple vehicle lane processing, which is the modified second multiple vehicle lane processing in the step S17, to calculate the set audio volumes $VLC_L$ and $VLC_R$.

During the second' multiple vehicle lane processing, firstly, the control unit 110B decides a vehicle lane position whether the vehicle lane upon which the vehicle CR is traveling is the outermost vehicle lane on the road, the lane closest to the edge of the road. If the result of the vehicle lane position decision is affirmative, the control unit 110B specifies either of the left or right side becomes edge of the road. The control unit 110B determines the arrival range for engine pseudonoise, which is broader than the arrival range BPA in the specified side, and minimum in the opposite side of the specified one.

Figure 14:
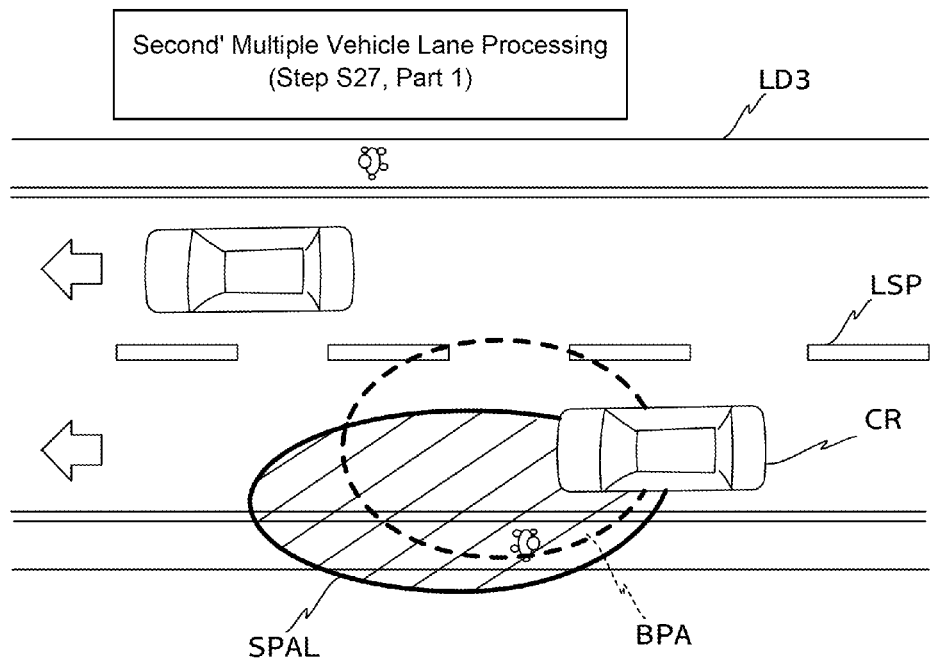
FIG. 14 is the figure for explaining the arrival range of the engine pseudonoise due to the second multiple vehicle lane processing of FIG. 13 (No. 1)
Figure 15:
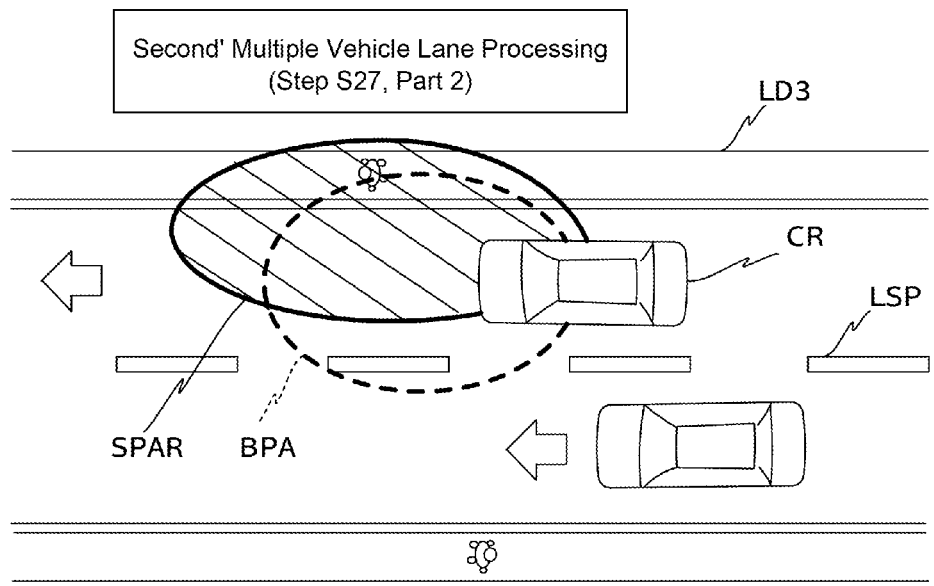
FIG. 15 is the figure for explaining the arrival range of the engine pseudonoise due to the second multiple vehicle lane processing of FIG. 13 (No. 2)

Examples of the determined arrival ranges are shown in FIGS. 14 and 15. Here, FIG. 14 shows the example of the arrival range SPAL when the specified side is left; and FIG. 15 shows that of the arrival ranges SPAR when the specified side is right.

On the other hand, if the result of the vehicle lane position decision is negative, the control unit 110B determines the arrival ranges for the engine pseudonoise so as to be minimal.

When the arrival ranges for the engine pseudonoise is thus determined, the control unit 110B calculates the set audio volumes $VLC_L$ and $VLC_R$ for the speakers $135_L$ and $135_R$ corresponding to determined the arrival ranges.

Note that, in the second example, if the result of the vehicle lane position decision processing in the second' multiple vehicle lane processing is negative, it is performed the audio volume setting that the engine pseudonoise is not outputted to the outside of the vehicle from either the speaker $135_L$ or the speaker $135_R$.

When the set audio volumes $VLC_L$ and $VLC_R$ is calculated in any of the steps S24, S26, or S27, the control unit 110B sends the calculated set audio volumes $VLC_L$ and $VLC_R$ to the engine pseudonoise output part 130. Then, the flow returns to the step S21. After that, the processing of the steps S21 through S27 is repeated, and the set audio volumes $VLC_L$ and $VLC_R$ are calculated sequentially. The calculated set audio volumes $VLC_L$ and $VLC_R$ are sent to the engine pseudonoise output part 130.

Upon receipt of the set audio volumes $VLC_L$ and $VLC_R$, the engine pseudonoise output part 130 performs the same operations as those in the first example. As a result, the engine pseudonoise at audio volumes according to the set audio volumes $VLC_L$ and $VLC_R$ is outputted from the speakers $135_L$ and $135_R$.

As explained above, in the second example, the control unit 110B analyzes the shot images around the vehicle by the photography unit 190, and acquires vehicle lane information for the road upon which the vehicle CR is traveling, including the information of the vehicle lanes number and the information of the presence of the opposite vehicle lane. The control unit 110B determines the arrival ranges for the engine pseudonoise being outputted outside of the vehicle on the basis of the acquired vehicle lane information; then it calculates the set audio volumes $VLC_L$ and $VLC_R$ for the engine pseudonoise from the speaker $135_L$ and the speaker $135_R$ of the engine pseudonoise output part 130 on the basis of the determined arrival ranges. As a result, the engine pseudonoise at audio volumes corresponding to the set audio volumes $VLC_L$ and $VLC_R$ is outputted towards the outside of the vehicle from the speaker $135_L$ and the speaker $135_R$ of the engine pseudonoise output part 130.

Due to this, according to the second example, as the same as in the first example, the output of the vehicle-evocative sound during traveling is controlled, considering the possibility for the existence of the subject that change depending on the classes of the road, namely, vehicle lane numbers.

Moreover, in the second example, if the vehicle lane number is "1", the control unit 110A determines the arrival range as the predetermined range BPA having symmetrical range to the traveling direction of the vehicle CR. If the number is plural, the control unit 110A determines the arrival range, which has the broader that the predetermined range BPA in the side wherein it is highly possible that the pedestrian or the like is closely present against the traveling direction of the vehicle MV as the predetermined range.

Due to this, according to the second example, the output of the vehicle-evocative sound during traveling is controlled, carefully considering the possibility for the existence of the subject.

[Modified Embodiments]

The present invention is not limited to the first and second examples, and a variety of modifications are possible.

For example, in the first example, the arrival ranges for the engine pseudonoise is determined on the basis of the vehicle lane number and the information of the presence for the opposite vehicle lanes. In contrast, it may be determined on the basis of further acquired vehicle traveling lane position information, as the same as in the second example.

Furthermore, in the first example, the navigation device having the storage unit that stores map information and the current position detection function materialize the functions for the vehicle-evocative sound generation device of the present invention. However, the vehicle-evocative sound generation device of the present invention may be configured as the independent navigation device and the like. In this case, if other device has the functions such as map storing function including the vehicle lane information and current position detection function, the present invention may utilize these functions.

Furthermore, in the first and second examples, it determines the arrival range, which has the broader range in the side wherein it is highly possible that the pedestrian or the like is closely present against the traveling direction of the vehicle MV as the predetermined range, when the vehicle is traveling on the road having the multiple lanes. In contrast, the arrival range of the side wherein it is highly possible that the pedestrian or the like is closely present may be the same as the case of BPA.

Furthermore, in the first and second example, the arrival range becomes minimal in the side wherein there is little possibility that the pedestrian or the like is present not so as to output the engine pseudonoise from the speakers, during the vehicle is traveling on the multi-lane road. In contrast, low volume level of the engine pseudonoise may be outputted from the speaker placed in the side wherein there is little possibility that the pedestrian or the like is present.

Furthermore, in the first and second examples, the engine pseudonoise output part 130 includes the two speakers, 135$_L$ and 135$_R$ that output a fixed level of sound. However, it may include at least one speaker, for example, which is placed on a controllable rotation member so as to determine the arrival range.

Furthermore, in the first and second examples, the engine pseudonoise output part 130 generates the engine pseudonoise having the waveform pattern determined on the basis of the accelerator information AR and the rotational speed information ER. However, it may generate the pseudonoise having a fixed waveform pattern. In this case, it is unnecessary to acquire the results of detection by the accelerator information sensor 220 and by the rotational speed information sensor 230.

Furthermore in the first and second examples, the vehicle speed was left out of consideration when determining the arrival range of the engine pseudonoise. However, it may make the arrival range of the engine pseudonoise broader, the higher the vehicle speed.

Furthermore, in the first and second examples, the arrival range of the engine pseudonoise is determined without taking consideration of the traffic situation such as traffic jam. However, for example, the arrival range may be determined with consideration of the traffic condition such as traffic jam; the engine pseudonoise is not outputted from the vehicle to the outside, when the vehicle is caught by the traffic jam.

Furthermore, in the first and second examples, the engine pseudonoise is outputted to the outside of the vehicle. However, other vehicle-evocative sound except the engine pseudonoise may be outputted to the outside of the vehicle, if it may invite the attention of the pedestrian or the like.

Furthermore, in the first and second examples, all of the elements necessary for output control of the engine pseudonoise are mounted to the vehicle CR. In contrast, it may be implemented a part of the elements into the terminal device mounted to the vehicle CR, and the remaining elements into the server device placed outside of the vehicle.

In this case, it is also possible to acquire the road width information for the road upon which the vehicle is traveling to determine the arrival range of the vehicle-evocative sound, which is outputted to the outside of the vehicle, on the basis of the acquired road width information.

Furthermore while, in the first and second examples, the position of the vehicle CR is detected by the separate resource. However, the position detection may be acquired by a device with a function of position detection (for example a portable telephone that is equipped with a GPS function) in the vehicle.

Furthermore, in the first and second examples, the vehicle-evocative sound generation device comprises the speakers. However, existing speakers may be used to control the output of the vehicle-evocative sound.

Furthermore, in the first and second examples, the present invention is applied to a device generating engine pseudonoise to be mounted to an electric automobile, which employs the electric motor as the drive mechanism. However, it may be applied to the device mounted to a so called hybrid cars, which employs the gasoline-electric hybrid as the drive mechanism. Moreover, it may be applied to the device that is mounted to the vehicle other than an automobile.

Note that, in the examples, the computer controls the vehicle-evocative sound generation by the execution of the program. However, a hardware utilizing dedicated LSI (Large Scale Integrated circuit) or the like may entirely or partially controls it.

<Control of the Arrival Ranges for the Engine Pseudonoise in Consideration of the Distance to an Intersection>

Next, "control of the arrival ranges for the engine pseudonoise in consideration of the distance to an intersection" is explained, which may be combined with the control of the arrival ranges for the engine pseudonoise on the basis of the vehicle lane information, in the first and the second examples and embodiments. In the following, the explanation assumes that the control unit 110A in the navigation device 100A of the first example performs the control.

Note that the vehicle speed sensor 210, the accelerator information sensor 220, and the rotational speed information sensor 230 are performing their detection operations, and they sent their detection results to the navigation device 100A. Moreover, each time the control unit 110A receives the detection results by the accelerator information sensor 220 and the rotational speed information sensor 230, accelerator information AR and rotational speed information ER, reflecting the detection results, are immediately sent to the engine pseudonoise output part 130.

Figure 16:
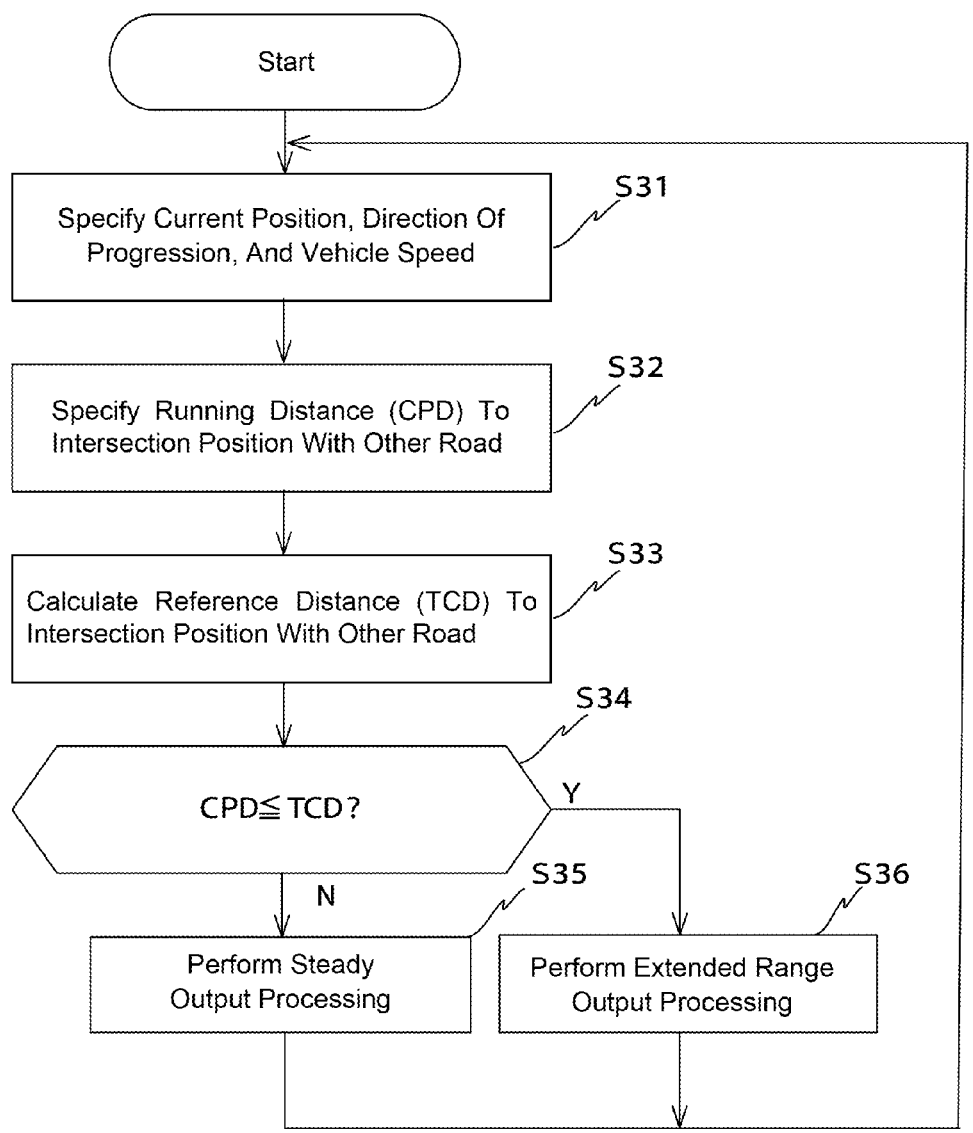
FIG. 16 is the flow chart for explaining the processing when arrival range of the engine pseudonoise is controlled in consideration of distance to the intersection.

When the engine pseudonoise generation is controlled, as shown in FIG. 16, firstly, the control unit 110A specifies the current position of the vehicle CR and its traveling direction on the basis of the map matching result in a step S31. Moreover, the control unit 110A specifies the vehicle CR speed on the basis of the detection result by the vehicle speed sensor 210.

Next, in a step S32, the control unit 110A specifies the running distance (CPD) from the position on the road on which the vehicle CR is traveling to the next intersection with the other road on the basis of the current position and the traveling direction of the vehicle CR, referring to the map information data MPD stored in the storage unit 120. Subsequently, in a step S33, the control unit 110A calculates a reference distance (TCD) to the intersection position on the basis of the vehicle speed. Here, the reference distance corresponding to the vehicle speed is calculated, because the approach of the vehicle CR to the intersection is effectively warned by the engine pseudonoise.

Next, in a step S34, the control unit 110A decides whether the running distance (CPD) to the intersection is not larger than the reference distance to the intersection (TCD). If the decision result is negative (N in the step S34), the flow proceeds to a step S35.

In the step S35, the control unit 110A performs normal output processing. In the normal output processing, the control unit 110A determines an arrival range FPA having symmetrical range against the traveling direction of the vehicle (see FIG. 17) as the arrival ranges for the engine pseudonoise. Here, the "arrival range FPA" is determined in advance on the basis of the experiment, simulation, experience and so on, from the standpoint such that it is difficult for the vehicles to passé one another and the pedestrians or bicycles can be passing on both sides of the road.

Subsequently, the control unit 110A calculates the set audio volumes $VLC_L$ and $VLC_R$ corresponding to the arrival range FPA for the speakers $135_L$ and $135_R$. The control unit 110A then sends the calculated audio volumes $VLC_L$ and $VLC_R$ to the engine pseudonoise output part 130.

If the decision result in the step S34 is affirmative (Y in the step S34), the flow proceeds to a step S36. In the step S36, the control unit 110A performs extended range output processing. In the extended range output processing, the control unit 110A decides whether the other road that intersects with the road on which the vehicle is traveling extends to the left or right side, or to both sides, referring to the map information MPD stored in the storage part 120. If the other road extends only to the left side, the control unit 110A determines the range, which is broader in left side and the traveling direction of the vehicle CR than the predetermined range, and includes at least the intersection, as the arrival range, corresponding to the running distance to the intersection.

If the other road extends only to the right side, the control unit 110A determines the range, which is broader in right side and the traveling direction of the vehicle CR than the predetermined range, and includes at least the intersection, as the arrival range, corresponding to the running distance to the intersection. Furthermore, if the other road extends to both of the side, the control unit 110A determines the range, which is symmetrically broader in both sides and the traveling direction of the vehicle CR than the predetermined range, and includes at least the intersection, corresponding to the running distance to the intersection.

Figure 17:
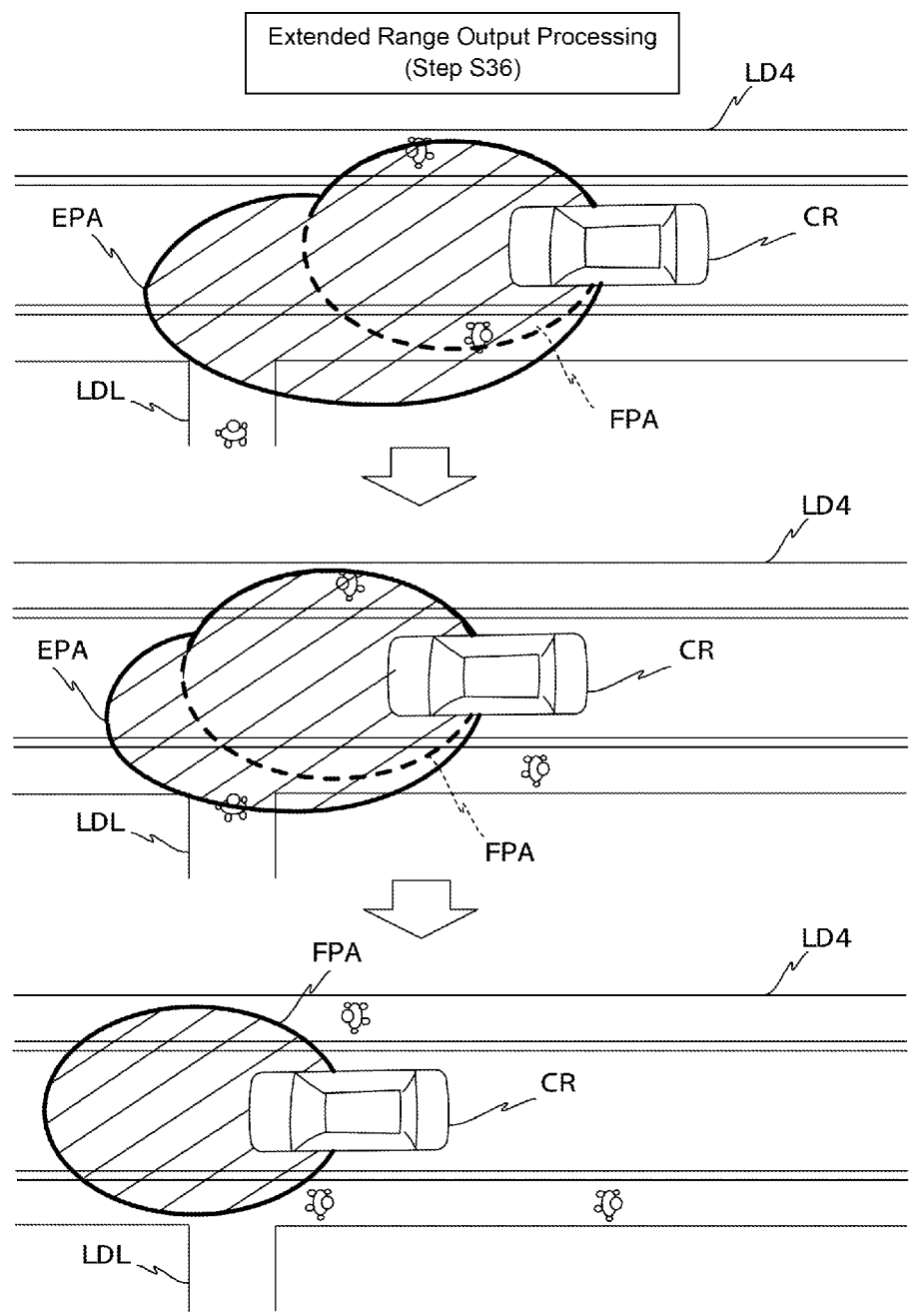
FIG. 17 is the figure for explaining the arrival range of the engine pseudonoise due to the extended range processing of FIG. 16.

Note that, in the example, the control unit 110A narrows the arrival range, when the running distance to the intersection becomes shorter; then, it makes the arrival range as the range FPA at the point that the running distance to the intersection becomes zero (see FIG. 17).

Subsequently, the control unit 110 calculates set audio volumes $VLC_L$ and $VLC_R$ for the speaker $135_L$ and the speaker $135_R$ corresponding to the determined arrival ranges. The control unit 110 sends the calculated set audio volumes $VLC_L$ and $VLC_R$ to the engine pseudonoise output part 130.

Note that FIG. 17 shows the example of change of the arrival range EPA determined by extended range output processing for the engine pseudonoise for the vehicle CR traveling on the single lane road, when the other road LDL that intersects with the road upon which the vehicle is traveling extends only to the left side.

When the processing in the step S35 or the step S36 is terminated, the flow returns to the step S31. After that, the processing in the steps S31 through S36 is repeated, and the set audio volumes $VLC_L$ and $VLC_R$ are sequentially calculated. The calculated set audio volumes $VLC_L$ and $VLC_R$ are sent to the engine pseudonoise output part 130.

As a result, when the distance from the current position of the vehicle CR to the position where the traveling direction of the vehicle CR is shorter than the predetermined distance, the output of the vehicle-evocative sound is controlled, considering the pedestrian or the like existing close to the intersection.

The invention claimed is:

1. A vehicle-evocative sound generation device that outputs vehicle-evocative sound from a sound output part to the outside of a vehicle comprising:
   one or more processors configured to:
      acquire vehicle lane information including vehicle lane information that specifies a number of vehicle lanes on a road upon which said vehicle is traveling, based on a current position of the vehicle,
      decide whether the number of vehicle lanes is one or is two or more, based on the acquired vehicle lane information,
      select a first predetermined vehicle-evocative sound arrival range over which vehicle-evocative sound output from said sound output part is to arrive, based on said acquired vehicle lane information when the number of vehicle lanes is decided to be one, and select a second predetermined vehicle-evocative sound arrival range over which the vehicle-evocative sound output from said sound output part is to arrive when the number of vehicle lanes is decided to be two or more, the first predetermined vehicle-evocative sound arrival range being different from the second predetermined vehicle-evocative sound arrival range, without determining whether a person exists in the vicinity of the vehicle; and
   a controller controlling an adjustment of a volume of the vehicle-evocative sound output from said sound output part to the outside of the vehicle, the volume corresponding to the selected first predetermined vehicle-evocative sound arrival range or the selected second predetermined vehicle-evocative sound arrival range.

2. The generation device for vehicle-evocative sound according to claim 1, further comprising:
   a storage storing map information including said vehicle lane number information for said road,
   the one or more processors detect the current position of the vehicle, and acquire said vehicle lane information for said road by referring to said storage on the basis of said current position detected by said one or more processors.

3. A vehicle-evocative sound generation device that outputs vehicle-evocative sound from a sound output part to the outside of a vehicle comprising:
   one or more processors configured to:
      acquire vehicle lane information including vehicle lane number information that specifies a number of vehicle lanes on a road upon which said vehicle is traveling, by analyzing images photographed by a camera, the camera photographing images around the path along which the vehicle is traveling,
      decide whether the number of vehicle lanes is one or is two or more, based on the acquired vehicle lane information,
      select a first predetermined vehicle-evocative sound arrival range over which vehicle-evocative sound output from said sound output part is to arrive, based on said acquired vehicle lane information when the number of vehicle lanes is decided to be one, and select a second predetermined vehicle-evocative sound arrival range over which the vehicle-evocative sound output from said sound output part is to arrive when the number of vehicle lanes is decided to be two or more, the first predetermined vehicle-evocative sound arrival range being different from the second predetermined vehicle-evocative sound arrival range, without determining whether a person exists in the vicinity of the vehicle; and
   a controller controlling an adjustment of a volume of the vehicle-evocative sound output from said sound output part to the outside of the vehicle, the volume corresponding to the selected first predetermined vehicle-evocative sound arrival range or the selected second predetermined vehicle-evocative sound arrival range.

4. The generation device for vehicle-evocative sound according to claim 1, wherein said one or more processors:
   determine a predetermined range symmetrical with respect to the direction of progression of said vehicle as said first predetermined vehicle-evocative sound arrival range, when the number of vehicle lanes on said road upon which said vehicle is traveling is one; and
   determine a broader range than said predetermined range as said second predetermined vehicle-evocative sound arrival range for the side with respect to the direction of progression of said vehicle on which it is estimated that a pedestrian may be present, when the number of vehicle lanes on said road upon which said vehicle is traveling is two or more.

5. The generation device for vehicle-evocative sound according to claim 1, wherein said one or more processors:
   determine a predetermined range symmetrical with respect to the direction of progression of said vehicle as said first predetermined vehicle-evocative sound arrival range, when the number of vehicle lanes on said road upon which said vehicle is traveling is one; and
   determine a narrower range than said predetermined range as said second predetermined vehicle-evocative sound arrival range for the side on which it is estimated that no pedestrian is present, when the number of vehicle lanes on said road upon which said vehicle is traveling is two or more.

6. A generation method for vehicle-evocative sound employed by a generation device for vehicle-evocative sound that outputs vehicle-evocative sound from a sound output part outside a vehicle, the method comprising:
   acquiring vehicle lane information including vehicle lane information that specifies a number of vehicle lanes on a road upon which said vehicle is traveling, based on a current position of the vehicle;
   deciding whether the number of vehicle lanes is one or is two or more, based on the acquired vehicle lane information;
   selecting a first predetermined vehicle-evocative sound arrival range over which the vehicle-evocative sound output from said sound output part is to arrive, based on said acquired vehicle lane information when the number of vehicle lanes is decided to be one, and selecting a second predetermined vehicle-evocative sound arrival range over which the vehicle-evocative sound output from said sound output part is to arrive when the number of vehicle lanes is decided to be two or more, the first predetermined vehicle-evocative sound arrival range being different from the second predetermined vehicle-evocative sound arrival range, without determining whether a person exists in the vicinity of the vehicle; and
   controlling an adjustment of a volume of the vehicle-evocative sound output from said sound output part, the volume corresponding to the selected first predetermined vehicle-evocative sound arrival range or the selected second predetermined vehicle-evocative sound arrival range.

7. A non-transitory computer-readable medium having recorded therein a generation program for vehicle-evocative sound that, when executed, causes a computer to execute the generation method for vehicle-evocation sound according to claim 6.

8. The generation device for vehicle-evocative sound according to claim 2, wherein said one or more processors:
   determine a predetermined range symmetrical with respect to the direction of progression of said vehicle as said first predetermined vehicle-evocative sound arrival range, when the number of vehicle lanes on said road upon which said vehicle is traveling is one; and
   determine a broader range than said predetermined range as said second predetermined vehicle-evocative sound arrival range for the side with respect to the direction of progression of said vehicle on which it is estimated that a pedestrian may be present, when the number of vehicle lanes on said road upon which said vehicle is traveling is two or more.

9. The generation device for vehicle-evocative sound according to claim 3, wherein said one or more processors:
   determine a predetermined range symmetrical with respect to the direction of progression of said vehicle as said first predetermined vehicle-evocative sound arrival range, when the number of vehicle lanes on said road upon which said vehicle is traveling is one; and
   determine a broader range than said predetermined range as said second predetermined vehicle-evocative sound arrival range for the side with respect to the direction of progression of said vehicle on which it is estimated that a pedestrian may be present, when the number of vehicle lanes on said road upon which said vehicle is traveling is two or more.

10. The generation device for vehicle-evocative sound according to claim 2, wherein said one or more processors:
   determine a predetermined range symmetrical with respect to the direction of progression of said vehicle as said first predetermined vehicle-evocative sound arrival range, when the number of vehicle lanes on said road upon which said vehicle is traveling is one; and determine a narrower range than said predetermined range as said second predetermined vehicle-evocative sound arrival range for the side on which it is estimated that no pedestrian is present, when the number of vehicle lanes on said road upon which said vehicle is traveling is two or more.

11. The generation device for vehicle-evocative sound according to claim 3, wherein said one or more processors:
   determine a predetermined range symmetrical with respect to the direction of progression of said vehicle as said first predetermined vehicle-evocative sound arrival range, when the number of vehicle lanes on said road upon which said vehicle is traveling is one; and
   determine a narrower range than said predetermined range as said second predetermined vehicle-evocative sound arrival range for the side on which it is estimated that no pedestrian is present, when the number of vehicle lanes on said road upon which said vehicle is traveling is two or more.

12. The generation device for vehicle-evocative sound according to claim 4, wherein said one or more processors:
   determine a predetermined range symmetrical with respect to the direction of progression of said vehicle as said first predetermined vehicle-evocative sound arrival range, when the number of vehicle lanes on said road upon which said vehicle is traveling is one; and
   determine a narrower range than said predetermined range as said second predetermined vehicle-evocative sound arrival range for the side on which it is estimated that no pedestrian is present, when the number of vehicle lanes on said road upon which said vehicle is traveling is two or more.

13. The generation device for vehicle-evocative sound according to claim 8, wherein said one or more processors:
   determine a predetermined range symmetrical with respect to the direction of progression of said vehicle as said first predetermined vehicle-evocative sound arrival range, when the number of vehicle lanes on said road upon which said vehicle is traveling is one; and
   determine a narrower range than said predetermined range as said second predetermined vehicle-evocative sound arrival range for the side on which it is estimated that no pedestrian is present, when the number of vehicle lanes on said road upon which said vehicle is traveling is two or more.

14. The generation device for vehicle-evocative sound according to claim 9, wherein said one or more processors:
   determine a predetermined range symmetrical with respect to the direction of progression of said vehicle as said first predetermined vehicle-evocative sound arrival range, when the number of vehicle lanes on said road upon which said vehicle is traveling is one; and
   determine a narrower range than said predetermined range as said second predetermined vehicle-evocative sound arrival range for the side on which it is estimated that no pedestrian is present, when the number of vehicle lanes on said road upon which said vehicle is traveling is two or more.

* * * * *